R. E. BECHTOLD.
METER FOR CONTINUOUS PUMPS.
APPLICATION FILED DEC. 1, 1916.
1,349,256.
Patented Aug. 10, 1920.
12 SHEETS—SHEET 1.
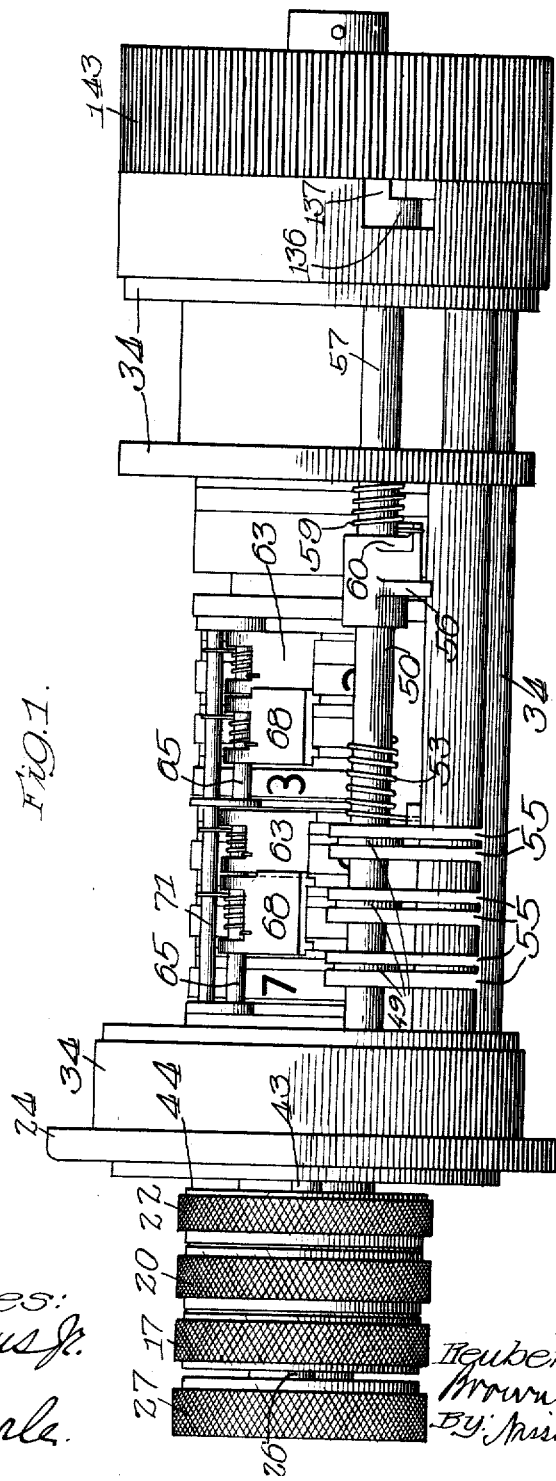

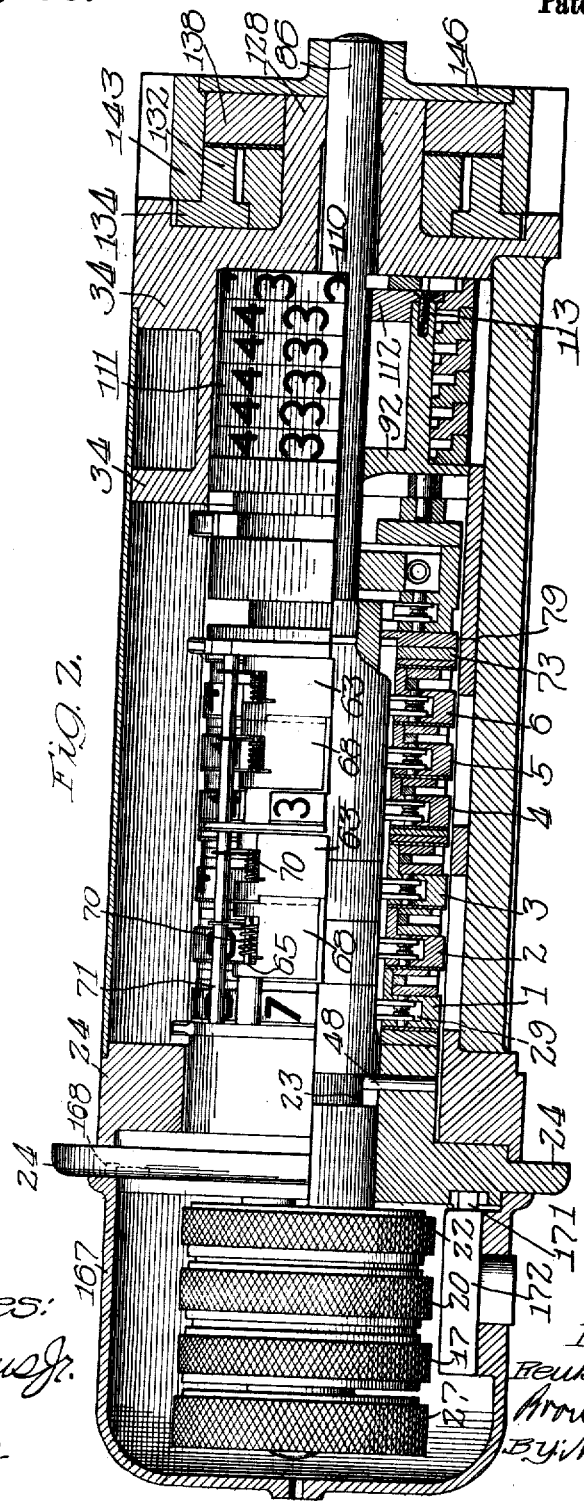

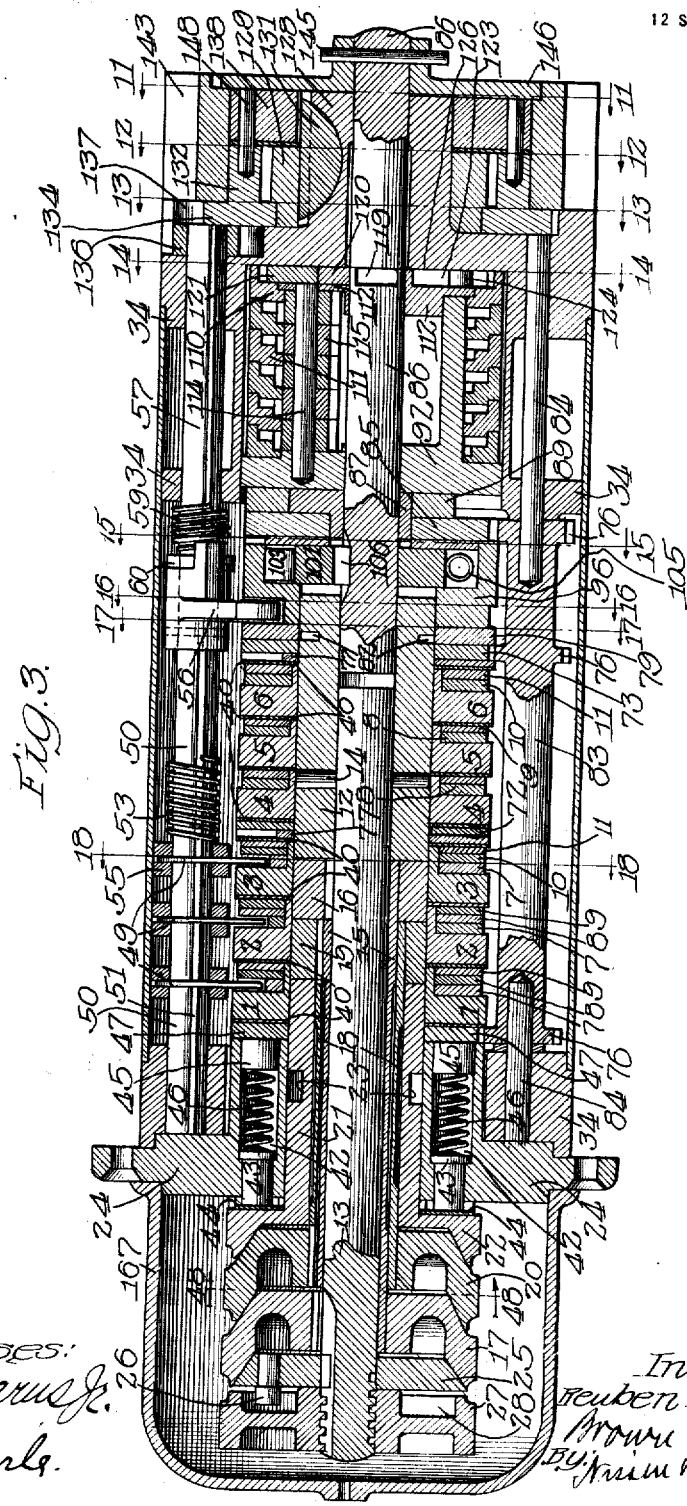

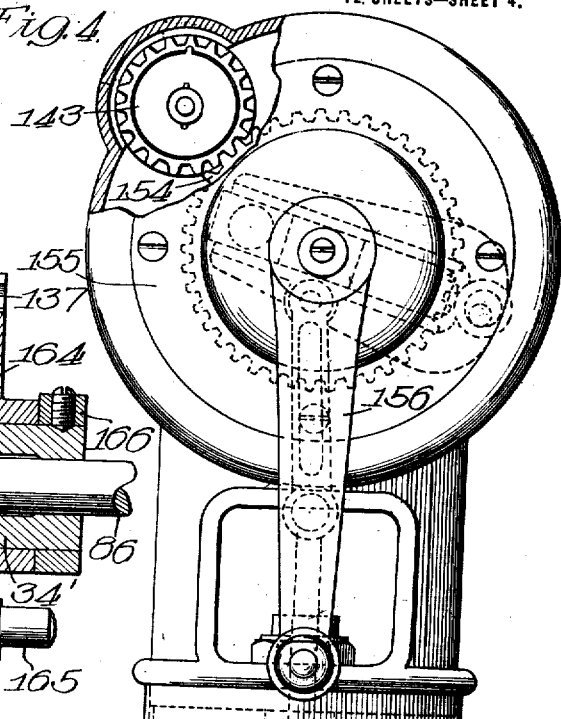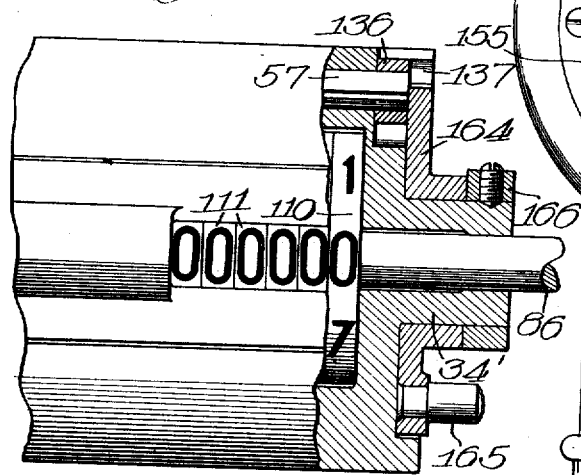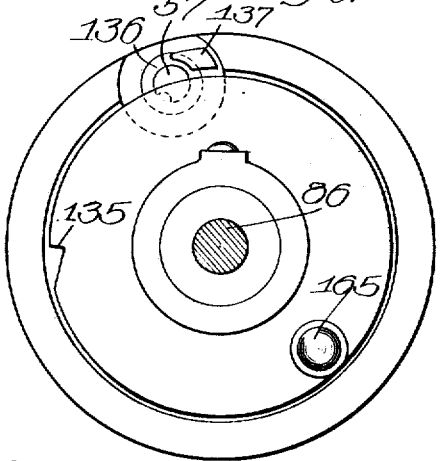

R. E. BECHTOLD.
METER FOR CONTINUOUS PUMPS.
APPLICATION FILED DEC. 1, 1916.
1,349,256.
Patented Aug. 10, 1920.
12 SHEETS—SHEET 5.
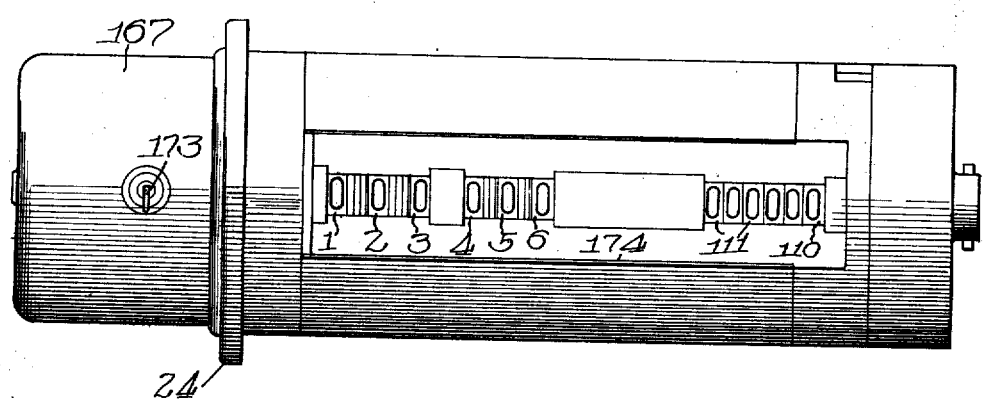
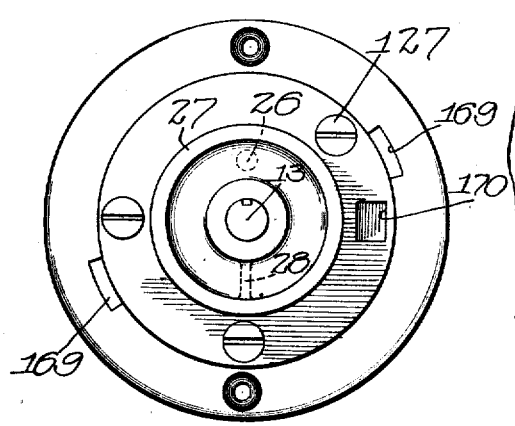
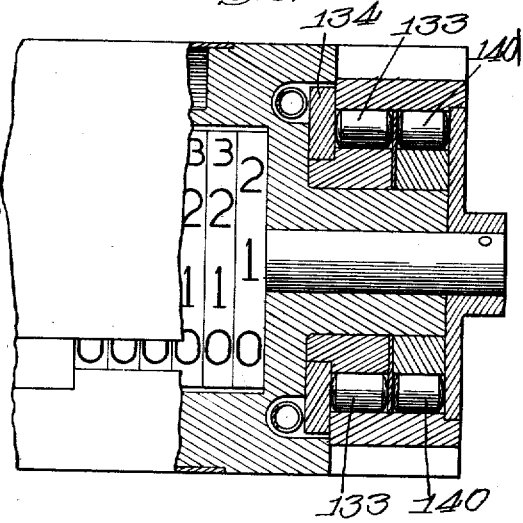
Witnesses:
G. W. Domarus Jr.
R. Bauerle
Inventor:
Reuben E. Bechtold
By Nissen & Sprinkle
Attys.

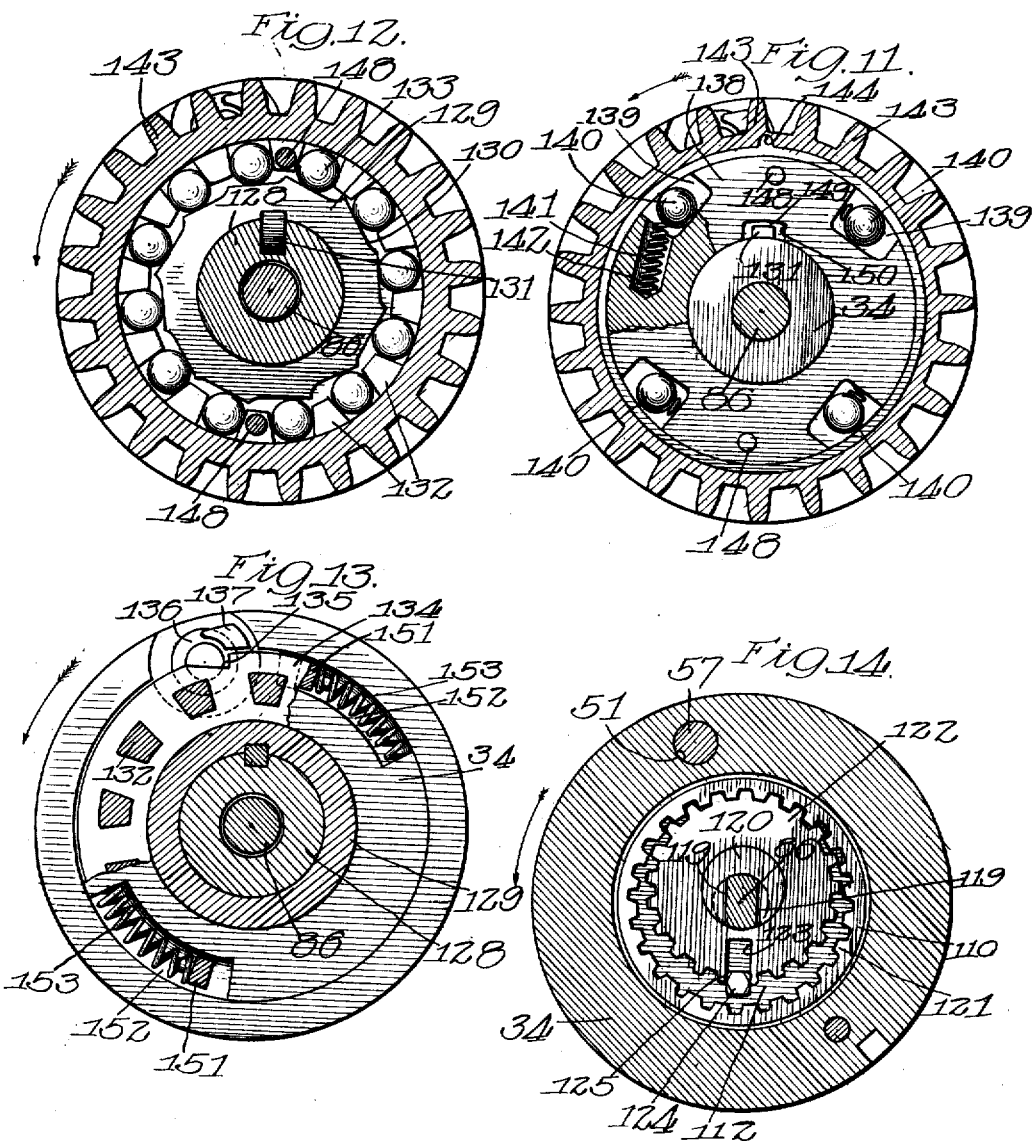

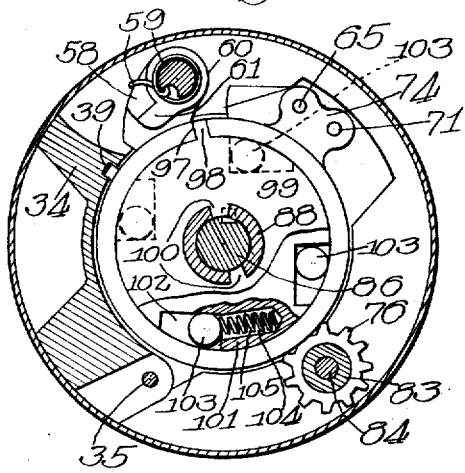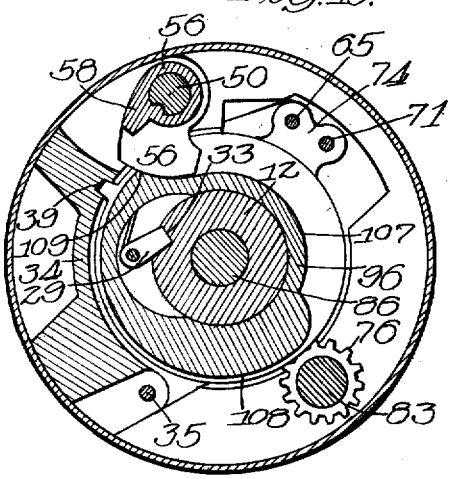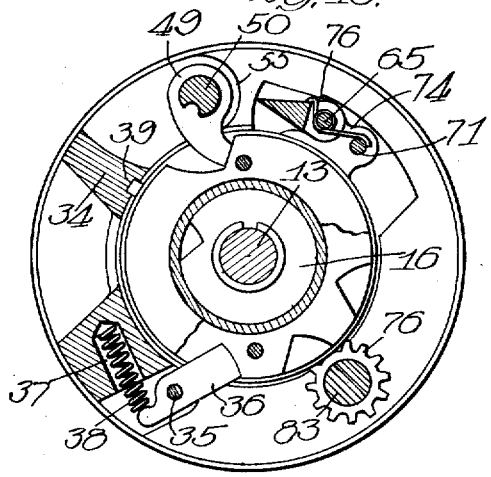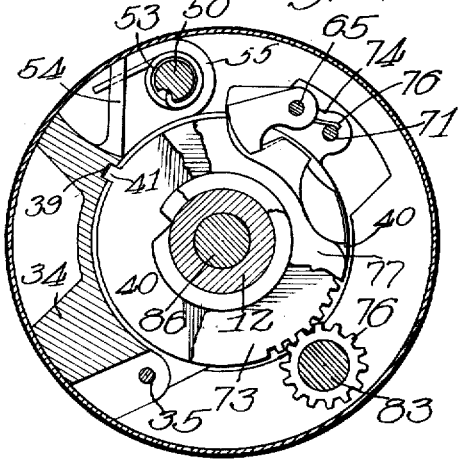

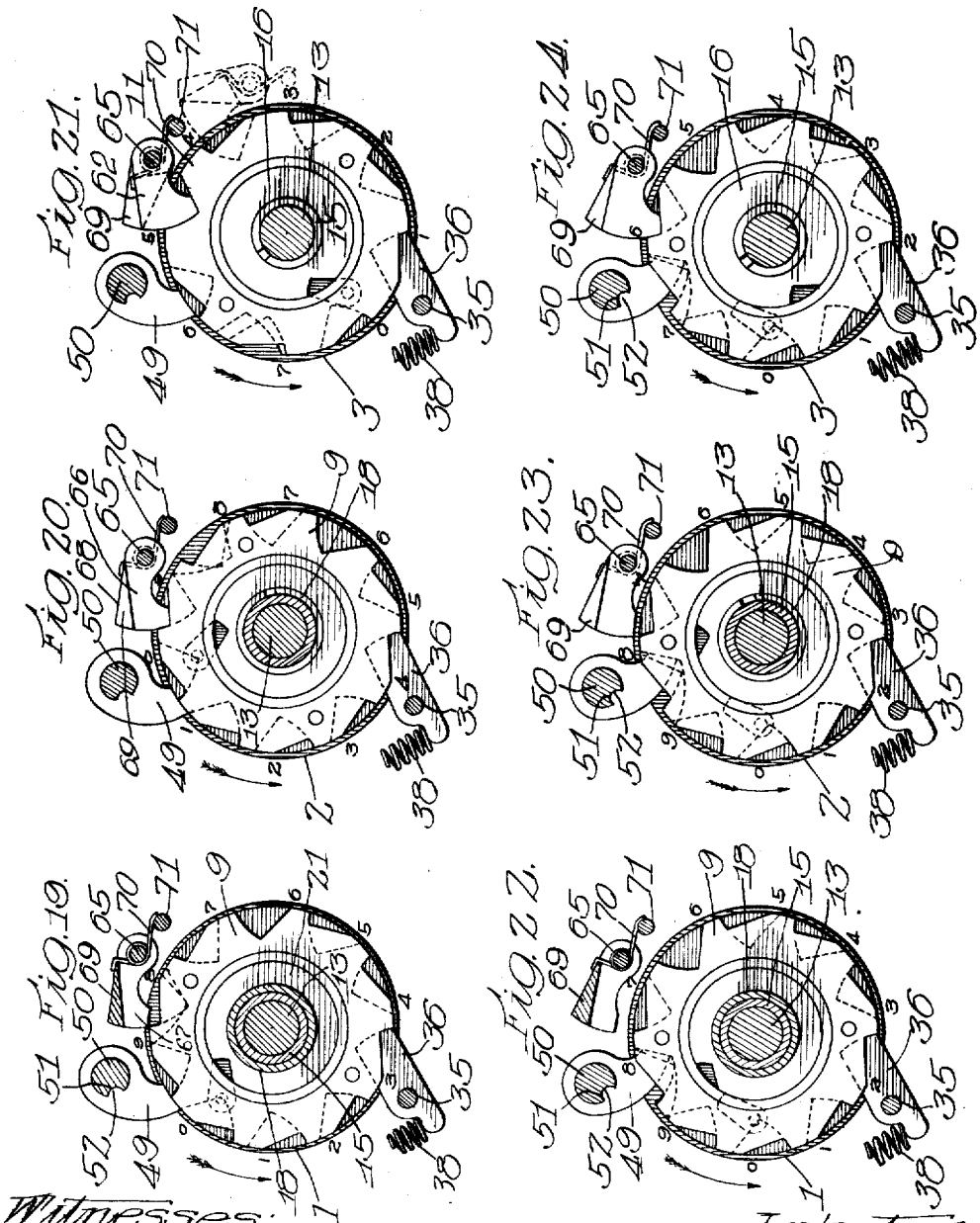

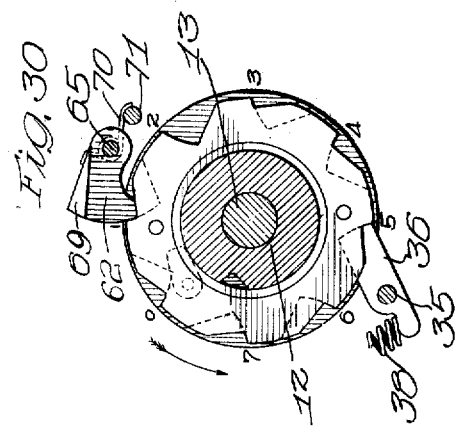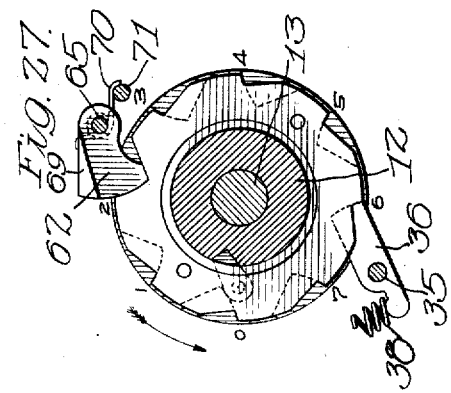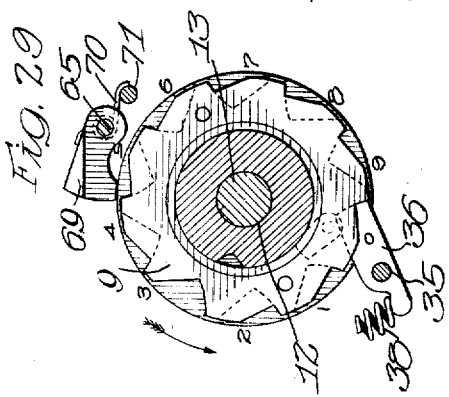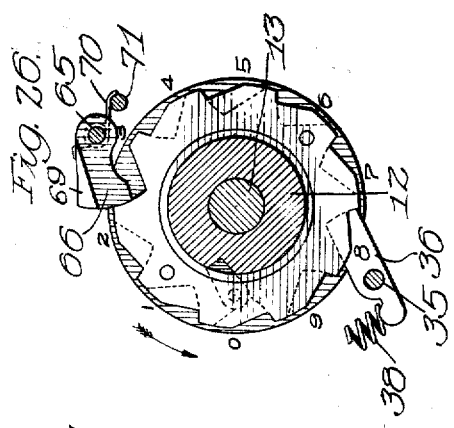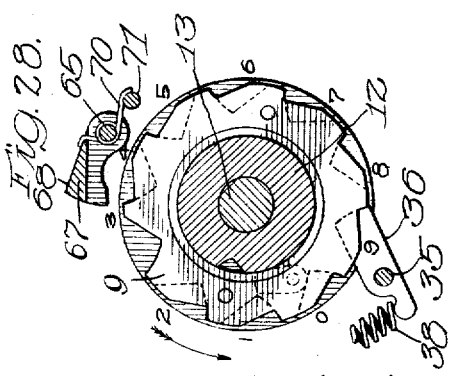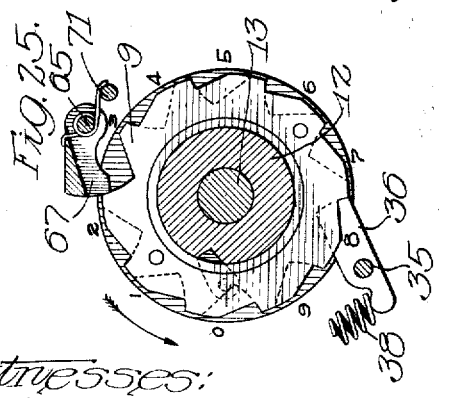

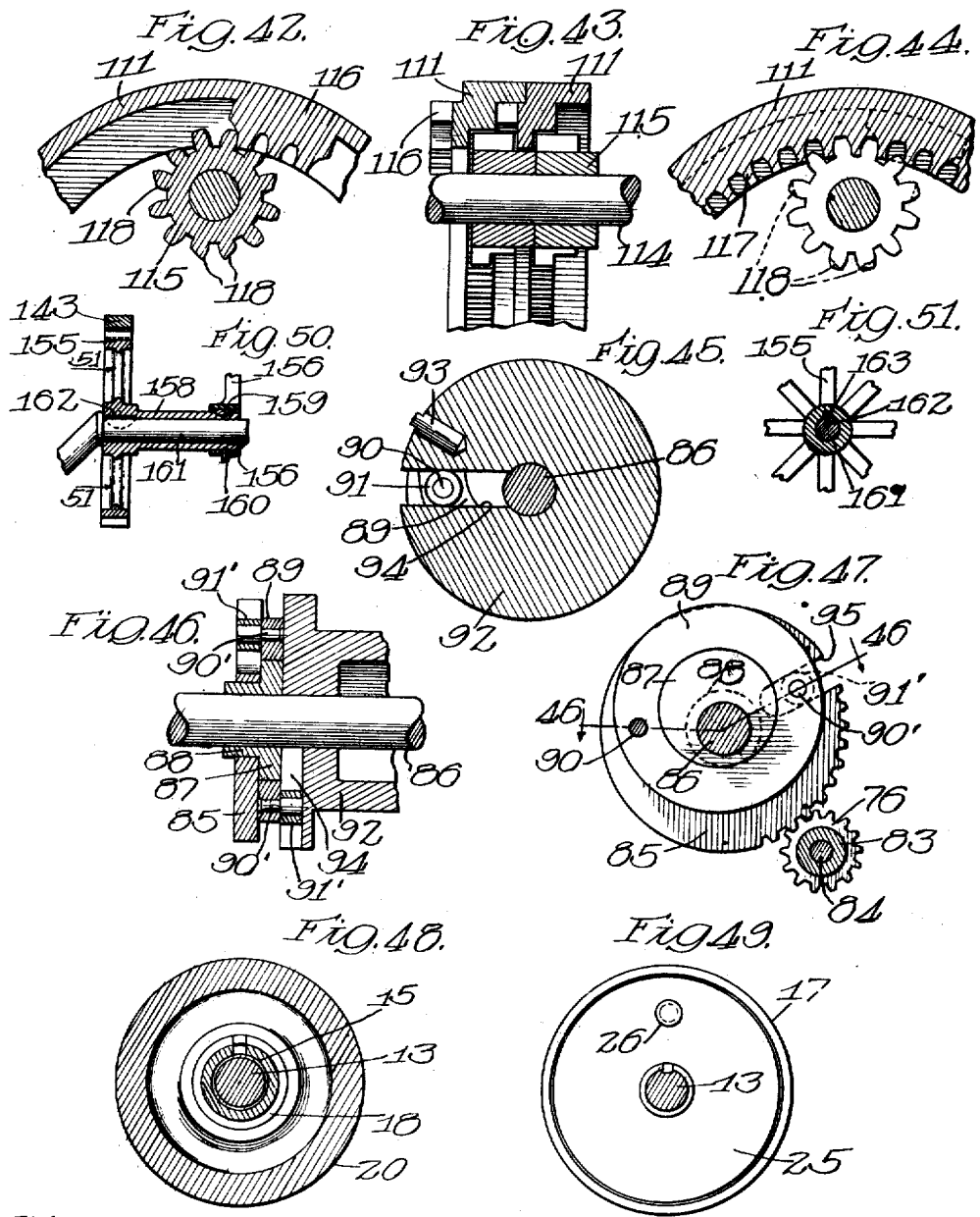

UNITED STATES PATENT OFFICE.

REUBEN E. BECHTOLD, OF FORT WAYNE, INDIANA, ASSIGNOR TO S. F. BOWSER & CO., INCORPORATED, OF FORT WAYNE, INDIANA.

METER FOR CONTINUOUS PUMPS.

1,349,256.

Specification of Letters Patent.

Patented Aug. 10, 1920.

Application filed December 1, 1916. Serial No. 134,271.

*To all whom it may concern:*

Be it known that I, REUBEN E. BECHTOLD, a citizen of the United States, residing at Fort Wayne, in the county of Allen and State of Indiana, have invented certain new and useful Improvements in Meters for Continuous Pumps, of which the following is a specification.

This invention relates to a meter for measuring and registering quantities, but more particularly designated, described and adapted for use in connection with pumps of the type commonly known as continuous pumps, which pump a certain quantity for a pre-determining movement of the pump operating means. More particularly, and in the present exemplification of the invention, the object is to provide means for pre-determining a quantity of liquid to be pumped, together with means for registering each individual quantity pumped and means for registering the total amount that has been pumped.

A further object of the invention is to provide a releasable connection between the pump and the meter and means to operate the releasing means when a pre-determined quantity has been pumped and to prevent the further operation of the pump until operative attention has been given thereto.

A further object of the invention is to provide means for pre-determining the amount to be pumped at any time with indicating means to register both the amount already pumped and the amount still to be pumped of the pre-determined quantity.

For the attainment of these ends and the accomplishment of other new and useful objects, as will appear, the invention consists in the features of novelty, in the construction, combination and arrangement of the several parts, generally shown in the accompanying drawings, and described in the specification, but more particularly pointed out in the appended claims.

Referring now more particularly to the drawings, and in the present exemplification of the invention, Figure 1 is a top plan view of a meter constructed in accordance with the principles of my invention, the meter casing being removed for clearness;

Fig. 2 is a plan view partly in section of the same, with the casings in position about the meter;

Fig. 3 is a sectional view of the meter;

Fig. 4 is a view showing the application of the meter to a pump of any desired or suitable structure;

Fig. 5 is a detail view partly in section, showing a modified form of the clutch operating mechanism;

Fig. 6 is an end view of the mechanism shown by Fig. 5;

Fig. 7 is an external view of the meter showing the positions of the pre-determining indicators, the individual counting register and the total counting register;

Fig. 8 is a view of one end of the meter at which the operating means for the pre-determining register is located;

Fig. 9 is a detail view of the clutch mechanism for the meter;

Fig. 10 is a detail view of the meter operating gear and the end plate connection therewith;

Fig. 11 is a detail sectional view taken on the line 11—11 of Fig. 3;

Fig. 12 is a detail sectional view taken on the line 12—12 of Fig. 3;

Fig. 13 is a detail sectional view taken on the line 13—13 of Fig. 3;

Fig. 14 is a detail sectional view taken on the line 14—14 of Fig. 3;

Fig. 15 is a detail sectional view taken on the line 15—15 of Fig. 3;

Fig. 16 is a detail sectional view taken on the line 16—16 of Fig. 3;

Fig. 17 is a detail sectional view taken on the line 17—17 of Fig. 3;

Fig. 18 is a detail sectional view taken on the line 18—18 of Fig. 3;

Fig. 19 is a view of one of the counter wheels of the pre-determining register;

Fig. 20 is a view of another of the counter wheels of the pre-determining register;

Fig. 21 is a detail view of the fractional counter wheel for the pre-determining register;

Figs. 22, 23 and 24 are views of the counter wheels illustrated by the Figs. 19, 20 and 21, all at the zero position;

Fig. 25 is a detail view of one of the individual counter wheels;

Fig. 26 is a detail view of another individual counter wheel;

Fig. 27 is a detail view of the fractional counter wheel of the individual register mechanism;

Figs. 28, 29 and 30 are views of the counter wheels shown by Figs. 25, 26 and 27 in position after a pre-determined quantity has been pumped.

Fig. 42 is a detail view of the engaging pinion for the total registering mechanism;

Fig. 43 is a detail view of the pinions and counter wheels of the totalizing mechanism;

Fig. 44 is a detail view of one of the pinions in engagement with one of the counter wheels of the totalizing mechanism;

Fig. 45 is a detail view of the fixed plate for the reciprocating mechanism;

Fig. 46 is a sectional view on the line 46—46 of Fig. 47;

Fig. 47 is a detail view of the mechanism for effecting the reciprocating movement;

Fig. 48 is a sectional view of one of the hand wheels of the pre-determining mechanism taken on the line 48—48 of the Fig. 3;

Fig. 49 is a view of the clamping plate of the pre-determining mechanism.

Fig. 50 is a detail view of the pump operating driving connection; and

Fig. 51 is a sectional view on the line 51—51 of Fig. 50.

The present invention relates to a liquid pump provided with a meter, the pump being controlled by the meter. If it is desired to pump a certain quantity of liquid, the desired quantity may be pre-determined, the clutch released, and the pump operated until it is stopped automatically when the pre-determined quantity of liquid has been pumped. If it is then desired to again pump the same quantity, it will not be necessary to again manipulate the pre-determining mechanism, but simply to operate the repeating mechanism and then operate the pump until it is automatically stopped. The releasing of the clutch is accomplished by operating the pre-determining mechanism and the crank handle, and the clutch engagement is entirely controlled by the pre-determining mechanism.

Means is provided for registering the pre-determined quantity to be pumped, for registering each individual quantity that is pumped, and for registering the entire amount pumped up to a certain amount.

The pre-determining mechanism and the individual registering mechanism each consist of a set of counter wheels placed side by side with digits on the face of them. Both sets of wheels are provided with tension pawls and counting fingers or pawls, the counting pawls of both sets being mounted upon an oscillating bar which is driven by the pump when it is operated. The counter wheels of the pre-determining mechanism are provided with digits so disposed that they will continually show a decrease in quantity as the pre-determined quantity is being pumped and when the decrease is continued to zero, a trip mechanism that communicates with the controlling clutch will be operated, whereupon the pump is stopped. Each of the counter wheels of the pre-determining mechanism is provided with a thumb wheel whereby the wheels may be set to a pre-determined quantity. These thumb wheels and the connecting means are also a part of the repeating mechanism. The mechanism which registers the total amount that may be pumped consists of a common or well-known form of counter wheels of a positive gear type.

Referring now more particularly to the drawings, and in the present exemplification of the invention, a plurality of counter wheels 1, 2, 3, 4, 5, and 6 (see Fig. 3) are provided with numbers on their faces to record the fractions and the units of measure. In the present exemplification of the invention, the pint being chosen as the fraction, the fraction wheels 3 and 6 have as a result eight digits on their faces, while all the other wheels have ten digits. It will be apparent from this that the capacity of the pre-determining mechanism is 99 gallons and 7 pints and the capacity of the individual register as recorded by the counter wheels 4, 5 and 6 is 100 gallons. The counter wheels 2 and 5 are the unit wheels and the wheels 1 and 4 are the tens wheels of the pre-determining mechanism and the individual register mechanism respectively.

Figure 37:
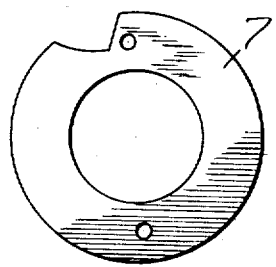
Fig. 37 is a view of one of the tumbler disks.
Figure 38:
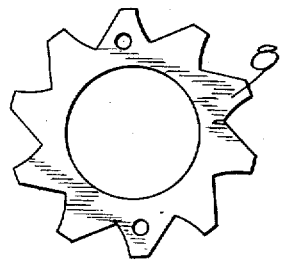
Fig. 38 is a view of one of the tension ratchet disks.

Each of the counter wheels above mentioned is formed with a central perforation and is preferably provided with a tubular extension about the perforation, upon which operating members for the counter wheels are mounted. Each of the counter wheels 1 and 2 is provided with a tumbler disk 7, a tension ratchet disk 8 and a counting ratchet disk 9 secured thereto by means of rivets or pins passing through suitable perforations in the disks and into the counter wheels. The tumbler disk is provided with one notch in its periphery, as shown, for example by Fig. 37; the tension ratchet disks are formed with the same number of notches in the periphery as the number of digits on the face of the wheel, ten in the case of the units and tens wheel, and eight in the case of the fraction wheel 3. This ratchet disk is shown by Fig. 38. The counting ratchet disks 9 (as shown, for example, in Figs. 19 to 30 inclusive) are provided with the same number of notches as the corresponding tension ratchet disks, with one of the notches deeper than the others. The counter wheels 4 and 5 are each provided with a tension ratchet disk 8 and a counting ratchet disk 9. The counter wheel 3 is provided with a tumbler disk 7, a tension ratchet disk 10 and a counting ratchet disk 11, the tension ratchet disk and the counting ratchet disk corresponding with the tension ratchet disk 8 and the counting ratchet disk 9 but consisting of eight teeth instead of ten. The counter wheel 6 is provided with a tension ratchet disk 10 and a counting ratchet disk 11 similar to the other tension and counting ratchet disks but having eight teeth or notches respectively. Counter wheels 4, 5 and 6 are freely mounted upon a perforated core 12 to which a shaft 13 is secured by means of a key 14. Freely rotatable upon the shaft 13 is a sleeve 15 to one end of which a collar 16 is keyed or otherwise suitably secured. Mounted upon the other end of the sleeve 15 is a hand wheel 17. Freely mounted about the sleeve 15 is a second sleeve 18 upon one end of which a collar 19 is secured and upon the other end of which a hand wheel 20 is secured. Surrounding the sleeve 18 and freely rotatable with respect thereto is a sleeve member 21 preferably formed integral with a hand wheel 22 at one end and having an annular groove 23 intermediate of the ends. The collars 16, 19 and the sleeve member 21 are preferably of the same outside diameter which is also the same as the outer diameter of the core 12. The sleeve member 21 is rotatable in the support 24, which is secured to the frame of the meter.

The hand wheels 17, 20 and 22 are preferably formed with beveled overlapping surfaces and splined upon the end of the shaft 13 is a plate 25 beveled to engage the adjacent face of the hand wheels 17 and provided with a projection 26 extending outwardly therefrom. The end of the shaft 13 upon which the hand wheels are mounted is provided with a right hand thread, preferably a square thread upon which is mounted a clamping wheel 27 provided with a radially extending cap 28 (see also Fig. 8), which is disposed to engage the projection 26 of the plate 25 to prevent the rotation of the clamping wheel more than a pre-determined amount. The object of this construction is to provide means for freely rotating each of the hand wheels to any desired position and to lock them in position by moving the clamping wheel 27 upon its threads whereby the plate 25 will be pressed longitudinally of the shaft to bind the hand wheels sleeve member and collars together in any fixed position. This constitutes a repeating mechanism, the function and operation of which will be hereinafter set forth.

Each of the counter wheels 1 to 6 inclusive, are provided with pawls 29 (see Figs. 2, 39 and 40) which are mounted in a suitable recess 30 by means of a pin 31 with a coil spring 32 surrounding the pin 31 and pressing against the pawl tending to press it in engagement with the adjacent collar or core. The core 12, collars 16, 19 and the sleeve member 21 are all provided with notches 33 (see also Figs. 19 to 30 and 33), in which the pawls 29 engage to rotate their respective members.

The support 24 is secured to the frame 34 in any suitable manner and the frame 34 is provided with a longitudinally extending bar 35 (see Figs. 15 to 17 inclusive), upon which are mounted the tension ratchet pawls 36 which engage in the notches in the tension ratchet disks 8 and 10. A recess 37 is provided in the frame adjacent each one of the pawls 36 in which a spring 38 is disposed, bearing upon the end of the pawl 36 tending to press it in engagement with the notches of the tension ratchet. These tension pawls 36 permit the counter wheels to be rotated in one direction but not in the other. The frame 34 is provided also with a longitudinally extending notch or groove 39 in its inner face (see Figs. 15 to 18 inclusive) and disposed upon the core 12 and the collars 16, 19 and sleeve member 21 are disks 40 provided with a projection 41 which engages in the groove 39 and prevents the disks from rotating. These disks are disposed between movable parts so that they will not be engaged and caused to rotate by frictional contact with an adjacent member.

In order to press the various counter wheels and operating mechanism close together, a tension device, or a plurality of such devices, are mounted in the support 24. The support 24 is provided with a plurality of holes 42 extending parallel with the opening for the member 21 in the support and each preferably formed with a shoulder therein. Disposed in the holes and projecting through the support are members 43 having a corresponding shoulder so that they may be retained in position in the holes. The outer ends of the members preferably bear against a plate 44 and disposed in each of the holes at the other end thereof is an abutment member 45. Disposed between the members 43 and 45 is a coil spring 46 tending to separate them so that the members 45 are pressed against a plate 47 which is freely rotatable upon the sleeve member 21 and of substantially the same outside diameter as the counter wheels. The plate 44 is preferably disposed in contact with the inside face of the hand wheel 22. It will be evident, therefore, that the springs 46 tend normally to press the shoulder of the annular groove 23 against a pin 48 (see Fig. 2) to maintain the core 12 and the shaft 13 locked in place. A suitable tube is provided for preventing their movement in a longitudinal direction so that the function of the spring is merely to press them closer together. The movement of the sleeve member 21 in a direction longitudinal of the shaft 13 is limited by means of a pin 48 (see Fig. 2) which is disposed in the support 24 and projects into the annular groove 23 of the sleeve member 21 so that this member can be moved only a pre-determined amount relatively to the support.

Each of the quantity counter wheels 1, 2 and 3 is provided with a tumbler 49 which engages with a notch in the tumbler disk 7 for each of the wheels. These tumblers 49 are mounted upon a shaft 50 which is provided with a groove 51, the tumblers each being provided with a projection 52 to fit the groove and to prevent the rotation of the tumbler with respect to the shaft. Surrounding the shaft 50 is a coil spring 53, one end of which is secured to the shaft and the other end of which has suitable engagement with a projecting portion 54 of the frame 34 (see Fig. 17) so that the tumblers 49 will be pressed into engagement with their corresponding tumbler disks. The tumblers 49 may be held in upright position and spaced along the shaft in any suitable manner, such, for example, as by means of the projections 55, of the frame 34 (see Fig. 1). A tumbler 56 is also secured to the shaft 50 in any suitable manner, the shaft 50 extending only part way through the hub of the tumbler. The shaft 57 similar to the shaft 50 is mounted in the frame 34 and extends into the hub of the tumbler 56 from the other side thereof, abutting the shaft 50. There is no connection made with the shaft 50 where it extends into the hub of the tumbler 56, the tumbler 56 merely keeping the shafts in alinement. The shaft 50, however, communicates with the shaft 57 through lug 58 on the tumbler 56, a spring 59 mounted upon the shaft 57 and a collar 60 (see Figs. 3 and 15), having a lug 61.

Figure 41:
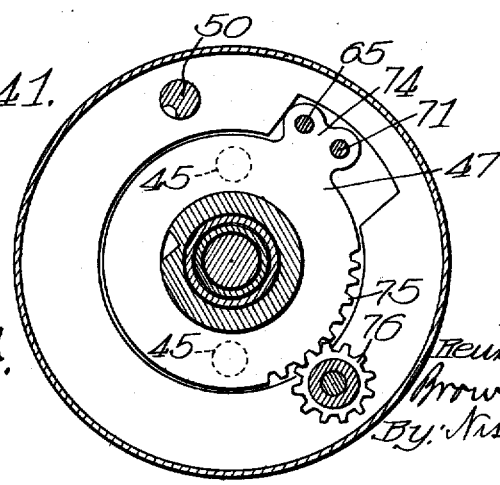
Fig. 41 is a sectional view of the mechanism for imparting reciprocating motion to the ratchet pawls.

The spring 59 bears against the lug 58 of the tumbler 56, tending to rotate the shaft 57 with respect to the shaft 50 and tending normally to maintain the lugs 61 and 58 in contact with each other (see Fig. 15). The lugs are disposed, however, so that the lug 58 will contact with the lug 61 under certain conditions producing a hammering effect. The other end of the shaft 57 is connected with the clutch mechanism in a manner hereinafter described. The counter wheels 1 to 6 inclusive are each provided with counting pawls; a top view of these pawls is shown by Figs. 1 and 2 and Figs. 35 and 36 show a detail perspective view of the pawls. Each of the fraction counter wheels 3 and 6 is provided with a counting pawl 62 having a lateral extending projection 63 and alined perforations 64, by means of which each pawl can be rotatably mounted upon a bar 65. The units counting pawl 66 and the tens counting pawl 67 are preferably formed with a connecting web 68 having a projection 69 which extends in the direction of the fraction counting pawl 62. These counting pawls are also provided with perforations 64 by means of which they may also be rotatably mounted upon the bar 65. The fraction counting pawl 62 is made separate from the other pawls for the reason that it must pass over eight projections in the present exemplification of the invention for one revolution of the counting ratchet disk, while the units and tens pawls engage the ten teeth, for each rotation of their corresponding counting ratchet disks. The pawls 62, 66 and 67 are graduated in size so that the engaging tip of the pawl 62 extends farther than the pawl 66 and the pawl 66 projects farther than the pawl 67. The counting pawl 62 and the counting pawls 66 and 67 in conjunction, are each provided with a coil spring 70 and a bar 71 extends parallel with the bar 65 to form an engaging member for one end of each of the springs, the other end of the spring being so disposed as to press the corresponding pawl or pawls in contact with its respective counting ratchet disk. By reference to Figs. 19 to 30 inclusive, it will be obvious that the units and tens pawls cannot register with the notches in their respective counting ratchet disks except when the fraction counting pawl 62 is in the deepest notch of the fraction counting ratchet disk. The bar 65 upon which the counting pawls are mounted and the bar 71 are fixed in plates 47, 72 and 73. The form of these plates is shown most clearly by Fig. 41, in which it will be seen that the plate is formed with a projection 74 in which are mounted the bars 65 and 71. A portion of the periphery of the end plates 47 and 73 are formed with gear teeth 75 and meshing with the latter is a pinion 76 by means of which reciprocating movement is communicated to the plates. The plate 47 is free to rotate upon the sleeve member 21 and the plates 72 and 73 are free to rotate on the core 12 so that the rotation of the pinions 76 in opposite directions will produce the oscillation of the plates and consequently of the ratchet pawls through a pre-determined arc, which is sufficient to impart a ratcheting movement to the corresponding counting ratchet disks. It will be understood, of course, that the movement of the counting disks is communicated to the respective counter wheels.

Figure 34:
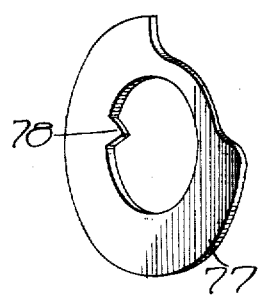
Fig. 34 is a detail perspective view of one of the pawl lifters.
Figure 35:
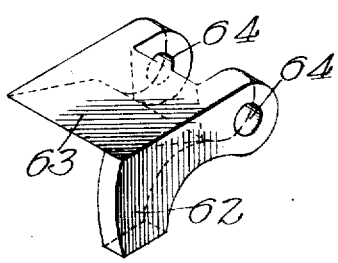
Fig. 35 is a perspective view of the pawl for the fractional counter wheel of both the pre-determining mechanism and individual register mechanism.
Figure 36:
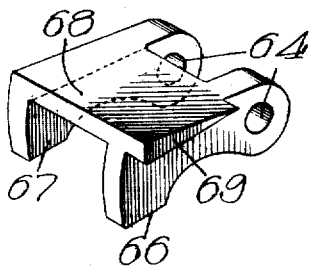
Fig. 36 is a perspective view of the pawls for the units and tens counter wheels of both the pre-determining mechanism and individual register mechanism.

Pawl lifting plates 77 are provided for lifting the pawls during the time the repeating and setting movement of the hand wheels is effected. One of these pawl lifters 77 is shown in perspective in Fig. 34, and each one is provided with a projection 78 by means of which they may be mounted upon the core 12 with the projection disposed in the groove 33 to prevent the rotation of the pawl lifters with respect to the core by permitting a longitudinal movement thereof. As the core 12 is rotated the pawl lifters are rotated with it. These pawl lifters are disposed to contact with the fraction counting pawls, and the disks 40 adjacent the pawl lifters 77 are also cut away as shown by Fig. 17 so that there will be no interference when the counting is effected and so that as the core 12 is rotated and before the counting pawls can move very far, the cam surface of the pawl lifters engage with the fraction counting pawls and raise both sets of counting pawls out of engagement with the counting ratchet disks, to prevent confusing the counter wheels.

Figure 31:
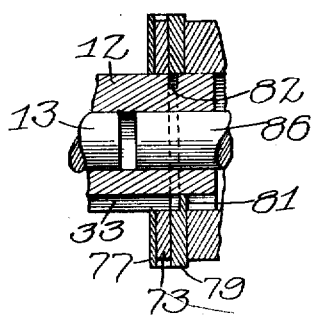
Fig. 31 is a detail view of the core in which the operating shaft is rotatable.
Figure 32:
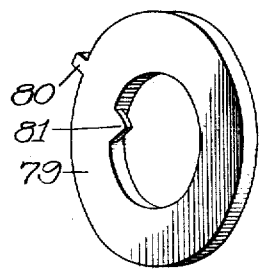
Fig. 32 is a detail perspective view of the locking plate for the pre-determining mechanism.
Figure 33:
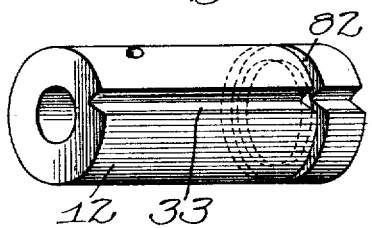
Fig. 33 is a detail perspective view of the core in which the end of the operating shaft is rotatable.

The core 12 is provided with a locking device, by means of which it may be fixed with respect to the frame of the meter. By releasing the locking device which engages with and holds the core in a fixed angular position with respect to the frame, the whole mass of numbering wheels and operating devices mounted upon the shaft 13 and the core 12 is free to be rotated by means of the clamping wheel 27 and the hand wheels. As before explained, the hand wheels may be locked together by means of the clamping wheel 27 so that when the said locking device for the core is released, the numbering wheels may be rotated by means of the clamping wheel or the hand wheels. The end of the shaft 13 is provided with a right hand screw thread and when the clamping wheel is screwed up against the plate 25, the hand wheels and their respective sleeves and collars will be forced together against the core 12 which is secured to the shaft 13 by means of the key 14. The friction is sufficient to hold the mass rigidly together upon the shaft 13. The locking device for the core 12 comprises a locking plate 79, shown in perspective by Fig. 32, and in cross section by Figs. 3 and 31. This locking plate is formed with an outward projection 80 which engages with the groove 39 extending longitudinally of the frame 34 and with an inward projection 81 adapted to engage in the groove 33 of the core 12, and substantially half as thick as the plate itself. The core 12 is formed with an annular groove 82 substantially as wide as the projection 81 and of sufficient depth to permit the core to be rotated in the locking plate when the projection 81 engages in the groove 82. In the locking position the projection 81 is disposed in the groove 33 at the side of the annular groove 82, as shown in Fig. 31, so that it is necessary to move the core 12 longitudinally with respect to the locking plate in order to permit the projection 81 to register with the annular groove 82, whereupon the core 12 may be freely rotated in the locking plate. If the core 12 and the connected parts are moved in a longitudinal direction to the right, as shown in Fig. 3, until the groove 82 is opposite the projection 81 of the locking plate 79, the core 12 and its connected parts may be rotated. The springs 46 mounted in the support 24 force the members 43 against the friction plate 44 and tend to hold the core 12 so that the projection 81 will remain in engagement with the core, as shown in Fig. 31, and so that the core cannot be rotated. By rotating the clamping wheel 27 the shaft 13 and the core 12, which is connected to the shaft, is moved just far enough to allow the projection 81 to engage in the groove 82 whereby the core may be freely rotated. In order to effect the repeating and set-back movement of the number wheels, the hand wheels are forced longitudinally in the direction of the core 12 by compressing the springs 46 until the groove 82 in the core is opposite the projection 81 of the locking plate. The core may now be rotated, and when the core is rotated until the groove 33 thereof registers with the projection 81, it will again be engaged by the tension of the compression springs 46, after which the operation may be repeated as before.

In order to give the reciprocating movement to the counting pawls and to oscillate the plates 47 and 73, as previously set forth, these plates are provided with the teeth 75 meshing with the pinions 76. These pinions may be connected in any suitable manner, but are preferably formed as an integral part of a bar 83 suitably mounted at its ends in the frame 34, as, for example, by means of pivot pins 84 disposed in the frame and projecting into the ends of the bar. This bar 83 is formed with three pinions, one meshing with the teeth in the plate 47, another with the teeth in the plates 73 and another with similar teeth in a plate 85 (see Figs' 3, 46 and 47). A shaft 86 for operating the meter is rotatably mounted at this end thereof with one end of the shaft projecting into the opening of the core 12, but having no connection therewith and merely inserted therein for the purposes of alinement. Disposed upon the shaft 86 and freely mounted thereon with the hub inside of the plate 85, is a member having an eccentric portion 87 and an extending hub 88 extending through the plate 85. Mounted upon the eccentric shaped portion 87 is an annular ring 89 which has a pin 90 with an anti-friction roller 91 mounted thereon and projecting laterally therefrom in one direction, and another pin 90' with an anti-friction roller 91' extending laterally therefrom in the opposite direction and substantially diametrically opposite in position from the other pin. The eccentric portion 87 and the annular ring 89 is disposed between the oscillating plate 85 and a support 92. This support 92 forms a bearing for the shaft 86 and also a support for the total register counters hereinafter described, and is keyed to the frame of the meter in any suitable manner, such, for example, as by means of a pin 93 having a projection which engages in the slot 39 extending longitudinally of the frame 34. The face of the support 92, which is adjacent to the eccentric portion 87 is formed with a radially extending slot 94 in which the projecting pin 90 and the roller 91 of the annular ring 89 extends (see Figs. 45 and 46). The oscillating plate 85 is provided with a radially extending slot 95 disposed substantially opposite the slot 94 in the support 92, and the other pin 90' and the roller 91' is adapted to engage in this slot. It will be evident, therefore, that the rotation of the eccentric member 87 in a single direction will cause the ring 89 to be oscillated in the slots 94 and 95, and since the position of the support 92 is fixed, the ring 89 will be oscillated about the pivot pin 91, which is movable in the slot 94, causing thereby an oscillating movement of the ring about this pin 90 as a pivot. This causes the other side of the ring 89 to be oscillated or vibrated back and forth in a pre-determined arc, communicating its movement to the oscillating plate 85, by means of the other pin 90' and roller 91', whereby an oscillating movement is given to the plate 85 and communicated to the pinions 76 of the bar 83. In order to rotate the eccentric member 87, having the projecting hub 88, a drum 96 is provided (see Fig. 3) which is rotatable upon the end of the core 12 and has an extended portion with a key-way 97 (see Fig. 15), in which a corresponding key 98 of a plate 99 extends. This plate is formed with keys 100 which engage with slots cut in the hub 88 of the eccentric member 87. Disposed within the drum is a ratchet member 101 (see Fig. 15) having inclined recesses 102 in the periphery thereof to contain the balls or rollers 103 and with recesses 104 to contain a spring 105. This ratchet member is keyed to the shaft 86 by means of a key 106 and the rollers operate in the well-known manner to engage the inside surface of the drum to rotate it with the shaft 86 in one direction of rotation only and to permit the drum 96 and the counting pawls to be returned to the regular starting points in case they were left otherwise by the previous use of the pump where a quantity other than multiples of a pint were pumped.

Figure 39:
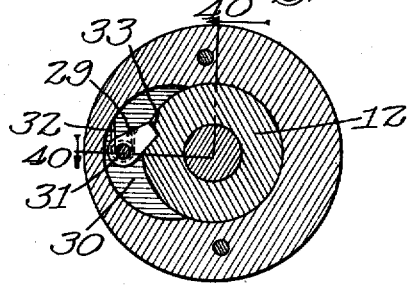
Fig. 39 is a detail sectional view of one of the counter wheel ratchets.
Figure 40:
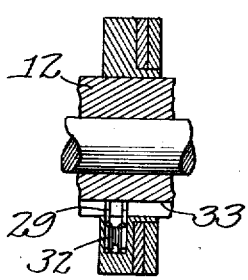
Fig. 40 is a detail view of the same taken on the line 40—40 of Fig. 39.

The drum 96 is provided with a pawl 29 which engages in a notch 33 of the core 12 in the manner already described, and particularly illustrated and described in connection with Fig. 39. The drum 96 is also provided with a notch represented by the cam surface 107 (see Fig. 16) and the function of the tumbler 56 will now be explained. Fig. 16 illustrates the position of the tumbler 56 when it engages with the notch of the drum. When any of the quantity counter wheels are turned, their corresponding tumblers are raised; the tumbler 56 which is fixed on the tumbler shaft 50 will also be raised so that the outer surface of the drum, as designated by the numeral 108 in Fig. 16, can pass under the surface of the pawl 56 in its raised position. The exact time of the clutch engagement is controlled by means of the communication of the tumbler 56 with the notch of the drum 96. By this arrangement, the time of the clutch engagement can be controlled much more accurately than if it were entirely controlled by the tumblers which engage with the tumbler disks on the quantity counter wheels, for it can be seen that the notches of the tumbler disks of the counter wheels must all register with their tumblers before the tumbler 56 will enter the groove of the drum 96 or pass the point designated by the numeral 109 to permit the tumbler and the tumbler shaft to be rotated into the notch of the drum whereupon all of the tumblers will drop, by reason of the corresponding rotation of the tumbler shaft 50.

The mechanism which registers the total amount that may be pumped from time to time consists of a common form of counter wheels of a positive gear type. These counter wheels are shown in cross section by Figs. 2 and 3, a portion of Fig. 2 showing also the numerals that appear upon the counter wheels. In the present exemplification of the invention this meter is described as registering pints so that one of the counter wheels designated by the numeral 110 will be referred to as the fractional counter wheel, while the other counter wheel will be designated by the numeral 111. These counter wheels are all freely rotatable upon the support 92 which is fixed with respect to the casing of the meter as described, and as shown by Fig. 45. In order to keep the counter wheels from slipping off, a cap plate 112 is secured to the support or core member 92 by means of screws 113 (see Fig. 2). Mounted at one end in the support 92 and at the other end in the plate 112 is a shaft 114 (see Fig. 3) and freely mounted upon the shaft are a plurality of pinions 115, which engage with teeth formed on the inside of the counter wheels. The construction and arrangement of these counter wheels are shown more clearly by Figs. 42, 43 and 44. The digits on the faces of the wheels are placed the same as the individual counting register so that the total amount pumped can be read directly through the corresponding aperture in the pump casing, as shown in Fig. 7. Referring now more particularly to Figs. 42, 43 and 44, each of the counter wheels 111 is provided with a lateral projection 116 containing three teeth, as shown in Fig. 42, and the other side of each counter wheel is provided with a toothed portion 117 in which the teeth extend entirely around the inside edge of the wheel. The pinions 115 for each wheel are disposed so that the teeth of one pinion engage two counter wheels. To accomplish this result, a portion of the teeth of each wheel are cut away at 118, as shown in Figs. 42 and 44. In the present exemplification of the invention, each of the pinions is provided with teeth, a portion of which engage the teeth 117 of one counter wheel 111 continuously and the other portion of the teeth of each pinion are cut away, as shown at 118 so that the projecting portion 116 of the preceding counter wheel will engage the full teeth during the rotation of the preceding counter wheel. This will cause the succeeding counter wheel to be rotated one notch, or it will advance one digit in the well-known manner, since the projection 116 of each counter must be rotated one complete revolution before it will engage the succeeding counter wheel and rotate in one division.

It will be remembered that the counter wheel 110 is a fractional counter wheel and while the pinion which meshes with the projection 116 of the counter wheel 110 is similar to the projection on the remaining counter wheel 111, means must be provided for rotating the fractional counter wheel 110 one-eighth of a revolution, while the operating shaft 86 of the meter is being rotated one complete revolution. The reason for this is that the meter is adapted and particularly designed to register pints and there are eight pints in a gallon. In order, therefore, to provide for the registering of the fractional parts of the gallon, an eight to one reduction gear is provided, which communicates with the operating shaft 86. The shaft is provided with flattened portions 119 (see Figs. 3 and 14), and an eccentric 120 with a corresponding slot in one edge thereof is slipped over the shaft on the flattened portion thereof. The inner edge of the fractional counter wheel 110 is provided with teeth 121, and mounted upon the eccentric 120 is a toothed gear 122 which is adapted to mesh with the internal teeth 121. This gear is provided with a slot 123 and protruding laterally from the cap member 112 is a lug 124 with beveled edges 125 which is adapted to engage in the slot 123 of the gear 122 and to prevent the rotation of this gear with respect to the cap plate 124. It will be seen, therefore, that as the shaft 86 rotates, the eccentric 120 will be carried with it causing the gear 122 to be moved to engage the teeth 121 of the counter wheel 110, the beveled edges 125 of the lug permitting the gear 122 to be oscillated slightly about the lug as a pivot but preventing the rotation thereof. The number of teeth on the gear 122 and the number of teeth of the counter wheel 110 must have a definite relation with respect to each other in order that the rotation of the shaft 86 shall produce the rotation of the counter wheel 110 once in eight revolutions. For this purpose the number of teeth on the plate 122 must be seven-eighths of the number of teeth on the counter wheel 110. In the present exemplification of the invention, the gear 122 is provided with twenty-one teeth, while the counter wheel 110 is provided with twenty-four teeth, the difference being three teeth, so that the counter wheel 110 is rotated one complete rotation when the shaft 86 has been rotated eight times. The counter wheels 111 will be rotated by the engagement of the counter wheel 110 in the well-known manner.

The gear 122 abuts the frame or core portion 34 at the face 126 thereof and the entire mass of number wheels and driving means are held in position laterally with respect to each other by just filling the space between the support 24 at one end of the meter and the face 126 just referred to. This support 24 is secured to the frame of the meter in any suitable manner, as for example, by means of screws 127.

The controlling clutch for the meter consists of a number of rollers which are made to engage at the proper time with the internal surface of the gear that has connection with the pump shaft and the faces of a stationary member inside of the gear. A roller ratchet is also provided to prevent the pump and meter from being turned backward and for releasing the clutch previous to starting the pump. Referring now more particularly to Figs. 3, 9, 11, 12 and 13, the core or frame 34 is formed adjacent the operating end of the meter with a hub shaped portion 128, upon which is mounted a clutch member 129 formed with a plurality of inclined faces 130. This clutch member 129 is preferably keyed to the hub shaped portion 128 by means of a Woodruff key 131. A crib 132 is mounted upon the clutch member 129 so that it is free to rotate and the crib member is adapted to provide means for holding the rollers 133 in their proper positions. The outer portion of the crib 132 is formed with a flange portion 134 in which is a notch 135. The end of the shaft 57 abuts the inside face of the crib member adjacent the flange portion 134 and mounted upon the adjacent end of the shaft is a member 136 having the projecting pawl 137 which may be moved in position to engage the notch 135 of the crib member 132 for locking the same in position. A roller ratchet 138 is also mounted upon the hub shaped portion 128 of the frame 34 and is free to turn thereon. The roller ratchet 138 is provided with a plurality of recesses 139 in which the clutch rollers 140 are disposed. Opening from the recesses 139 are chambers 141 in which are springs 142 which press against the rollers 140, tending to press the rollers outwardly. Surrounding the roller ratchet 138 is a gear 143 which forms the driving connection of the meter and the interior surface of the gear 143 is disposed in close proximity to the rollers 140, so that the pressure of the springs 142 tends to press the rollers 140 into engagement with the interior surface of the gear 143 and the faces of the recesses 139 of the roller ratchet 138. The faces of the recesses are inclined in the direction opposite to the faces 130 of the clutch member 129, for a purpose to be hereinafter set forth.

In order to form connection between the driving gear 143 and the driving shaft 86, the gear is provided with a notch 144, and secured to the shaft 86 in any suitable manner, such for example, as by means of the pin 145, is a plate 146 having a projection 147 (see Fig. 10) which engages in the notch 144 of the gear 143. Thus, it will be seen that any movement which is given to the gear 143 by reason of its engagement with other gears or the like will be transmitted directly to the operating shaft 86.

The roller ratchet 138 and the crib 132 are both provided with holes or openings which register, in which are disposed pins 148 so that both the crib and the ratchet member must move in unison. The ratchet member 138 is provided with a key-way 149 which is adapted to receive the Woodruff key 131, and the key-way is of such a width that the clutch rollers 133 will engage before one shoulder, as 150, of the key-way strikes the key 131, and when the opposite shoulder of the key-way does strike the key, the clutch rollers 133 will be entirely disengaged.

Preferably, the crib 132 and the ratchet 138 are of the same outside diameter and provide a bearing surface for the gear 143.

Extending laterally from the flange 134 of the crib 132 are lugs 151, preferably two in number, and disposed diametrically opposite from each other. The face of the core member or frame 34 is provided with recesses 152 in the peripheral edge thereof, which are adapted to receive the projecting lugs 151 and to form a receptacle for springs 153 which are disposed between the lugs and a shoulder of the recesses in such a position that the springs tend to rotate the cribs 132 in the direction of the arrow, as shown in Fig. 13. With the cribs rotated in this direction, the rollers 133 (see Fig. 12) will be in a position to engage the outer faces of the clutch member 129 and the inner surface of the gear 143 to prevent its rotation. By rotating the crib member 132 in a forward direction against the tension of the springs 153, the notch 135 may be moved in such a position that the pawl 137 may be engaged therein and hold the crib 132 in such a position that the rollers 133 will permit the gear 143 to rotate freely in the direction of the arrow, as shown in Fig. 12. This is taken as the normal direction of movement of the gear 143 when the pump is being operated. In order to move the roller crib 132 so that the notch 135 in the flange thereof may engage the pawl 137, the lost motion connection between the core member 34 and the roller ratchet 138 is provided, which comprises the Woodruff key 131 and the recess 149, already described. When the gear 143 is rotated in a direction the reverse of the direction indicated by the arrow (see Fig. 11), the rollers 140 will engage the inner surface of the gear 143 and consequently the ratchet member is carried with the gear until the shoulder of the recess 149 strikes the key 131. This causes the roller ratchet member 138 and also the crib 132, which is connected thereto, to be moved to such an extent that the roller crib will be rotated in a reverse direction sufficiently to engage the pawl 137 in the notch 135, as previously explained. The function of this ratchet is two-fold; to prevent the turning of the pump crank backward and also to release the clutch as described. In this connection, it will be remembered that a spring 59 is provided in connection with the shaft 57 carrying the member 136, which has the pawl 137 at the end thereof, and the function of this spring is to tend to rotate the shaft 57 in a direction to engage the pawl 137 in the notch 135. Thus, it will be seen that a slight backward movement of the operating gear 143 is necessary in order to lock the roller crib in such a position as to permit the rotation of the gear 143 in the operating direction. Otherwise the rotation of the gear in the direction indicated by the arrow (see Fig. 12) would cause the rollers 133 to engage the surfaces of the clutch member 129 with the interior surface of the gear 143 to prevent the rotation of the latter.

Although this meter may have a general application, it is particularly designed for use in connection with a pump, as shown, for example, in Fig. 4 of the drawings, the operating gear 143 of the meter being adapted to mesh with a driving gear 154 of a pump designated generally by the reference numeral 155. This pump may be of any desired or suitable construction, but preferably is of the type in which the rotation of a crank 156 in a single direction will produce the continuous discharge of the fluid to be pumped from a discharge tube 157. It is evident that there are many different types of pumps which will fulfil this requirement. The crank 156 is provided with a loose motion connection between it and the driving mechanism of the pump, for example, as shown more clearly in Figs. 50 and 51, so that a slight movement of the crank 156 may be made in either direction without operating the pump. In the construction shown by these two figures, the driving gear 155 is provided with a sleeve 158 secured to or formed integral therewith, to which the operating crank 156 is secured in any well-known manner, as for example, by means of a key 159 and a screw 160. Rotatable within the sleeve 158 is a crank shaft 161 and this crank shaft is provided with a key-way to receive the key 162. The hub of the gear 155 is provided with a key-way 163 wider than the key 162 so that a slight movement is obtained between the gear and the crank shaft without operating the crank shaft 161. In other words, the gear may be rotated back and forth through a slight angle, say about five degrees or so, without rotating the crank shaft. The object of this construction is to provide means for rotating the crank 156 in a direction reverse of the normal operating direction of rotation, so that the driving gear 155 may be rotated slightly without rotating the crank shaft 161 and thereby operating the pump. The movement of the driving gear 155 causes a corresponding movement of the operating gear 143 of the meter and by rotating these gears in the reverse direction, the operating gear 143 may be moved backwardly, carrying with it the crib 132 until the pawl 137 engages in the notch 135.

A modified form of the controlling mechanism is shown by Figs. 5 and 6, in which it will be seen that the meter shaft 86 extends through a core or casing member 34' corresponding to the member 34 as shown in Fig. 3, and a plate 164, provided with a notch 135 and with a handle or knob 165, is rotatably mounted on the hub shaped portion of the member 34' so that the notch thereof may be engaged by the pawl 137, as previously described. A collar 166 is secured to the member 34' in any suitable manner, so as to retain the plate 164 in position. This plate may be rotated at will to release or engage the pawl 137 with the notch 135 of the plate. This shows how the meter could be constructed for power pump use. The knob 165 is then made to communicate with any suitable clutch which connects the source of power to the pump, the plate being moved when the clutch is engaged, so that the pawl 137 will engage with the notch 135 and will hold it there until the tumblers drop, whereupon the clutch will be disengaged and the power disconnected from the pump automatically at the proper time. This is substantially the same as is shown and embodied in the preferred embodiment of this construction.

A cap 167 is provided for inclosing the hand wheels at one end of the meter, which is preferably formed with lugs or projections 168 (see Fig. 2), and the support 24 is provided with corresponding recesses 169 (see Fig. 8). The support is also preferably provided with a recess 170 which is adapted to be engaged by a bolt 171 of a locking device 172 (see Fig. 2) which is mounted in the cap and which is provided with a keyhole 173 in the outer face of the cap, as shown by Fig. 7. With this construction, the cap 167 may be locked upon the meter so that no unauthorized person may have access to the finger wheels for setting the predetermining mechanism to any desired point, thereby releasing the clutch.

The casing of the meter is provided with an aperture or window 174, as shown in Fig. 7, by means of which the proper numerals of the predetermining and registering mechanism are disclosed.

In order to understand the operation of the predetermining and quantity registering mechanism, it will be assumed that a certain amount of fluid is to be pumped and the predetermining mechanism is set for the predetermined amount. If we assume, therefore, that a definite quantity, say for example, twelve gallons and seven pints, is to be pumped, the counter wheels 1, 2 and 3 are set for this amount by rotating the hand wheels 17, 20 and 22 in the direction of the arrows in the several figures. Referring more particularly to Figs. 3 and 19 to 30 inclusive, the operation will be more readily understood. The rotation of the hand wheels 17, 20 and 22, carrying with them the corresponding collars for the counter wheels 1, 2 and 3, causes the notch of each collar to be engaged by the pawl 29 of each counter wheel, so that the rotation of the hand wheel for any counter wheel will effect its movement independently of the others. In this manner the counter wheels 1, 2 and 3 may be set so that the numerals corresponding to twelve gallons and seven pints will be visible through the look-out or aperture in the casing of the meter. At this time the counter wheels 1, 2 and 3 will take the positions shown by Figs. 19, 20 and 21, the numerals upon the faces of the counter wheels being indicated by the numerals which appear about the periphery of the counter wheels in these figures. When the counter wheels are in this position, the clamping wheel 27 may be threaded upon the shaft 13 to bind the several hand wheels in fixed position with respect to each other by clamping them against the core 12 which is fixed to the shaft 13 by means of a key 14. At the same time that the predetermining mechanism is adjusted to indicate the amount to be pumped or registered, the individual registering mechanism should be set so that the counter wheels 4, 5 and 6 (see Figs. 25, 26 and 27) will all register zero. This is accomplished by pressing the shaft 13 longitudinally toward the other end of the meter, whereby the core may be freed from its engagement with the locking plate 79, as previously set forth, whereupon a single rotation of the core 12 will clear the individual registering mechanism, causing the counter wheels 4, 5 and 6 to engage by means of their corresponding pawls with the notch 33 of the core so that the counter wheels will take the positions shown by Figs. 25, 26 and 27, in which it will be noted that the numerals on the counting wheels which appear through the look-out aperture of the meter casing will all be zero. With the counter wheels in the positions just described, it will be obvious that the tumblers 49 will all be raised (see Figs. 19, 20 and 21) so that the counter wheels may be rotated in the direction indicated by the arrows. Of course, the action or operation of the meter depends upon the controlling clutch, which has been previously described. The operation of the ratchet mechanism, by means of which the counting pawls are reciprocated, will now produce the corresponding rotation of the counting ratchet disks and consequently of the counter wheels.

As the pump is operated, the predetermining mechanism shows a continuously decreasing quantity, as will be evident from an inspection of the numerals which appear about the periphery of the counter wheels in Figs. 19 to 24, inclusive, while the individual register mechanism shows a continuously increasing quantity as the pump is operated, as is evident from the numerals appearing about the peripheries of the counter wheels, as shown in Figs. 25 to 30, inclusive. Another way to state this is that the predetermining mechanism continually shows how much there is yet to be pumped of the total predetermined quantity at which the predetermining counting wheels have been set. This diminishing register process continues until all of the predetermining counter wheels register zero, as shown by Figs. 22, 23 and 24, whereupon the individual quantity mechanism will register the total predetermined quantity that has been pumped, as shown by Figs. 28, 29 and 30. In this operation, it will be evident that the notches of the tumbler disks for the counter wheels 1, 2 and 3 will not register until the digits zero of each of the counter wheels register. Hence, the tumblers 49 cannot rotate from the position shown by Figs. 19, 20 and 21, to the position shown by Figs. 22, 23 and 24 until the total predetermined quantity has been pumped. It will also be seen that when the counter wheel 2 has registered zero the last time in pumping a predetermined quantity, the counter wheel 3 will still have seven spaces to move; hence, it would appear that the exact time of the clutch engagement depends upon this wheel 3. This wheel, however, only determines the time with regard to the number of back and forward movements of the counting ratchet pawls, while the fraction of the gallon is being pumped, and the drum 96 is the final determining member with which the tumbler disks may take the position as shown by Figs. 22, 23 and 24. This movement of the tumbler disks permits the shaft 50 to rotate and to release the pawl 137 at the end of the shaft 57 to operate the clutch mechanism for the operating gear 143 in the manner previously set forth.

If it should be desired to have each pumping registered by means of the individual register mechanism, then between each pumping the set back of the register counter wheels 4, 5 and 6 must be effected. We will assume that the same quantity, twelve gallons and seven pints is to be pumped again and note the working of the register. After having set the predetermining counter wheels and clamping them together in the manner described, the shaft 13 may be rotated one revolution, leaving them just as they were set and at the same time the individual register counter wheels will be set back to zero. After the clutch release has been effected, the pump is ready to be operated again, to pump the same quantity.

It is obvious that the action of the pawls of the individual register mechanism is the same as in the predetermining mechanism.

It will also be noted that since the sleeve member 21, collars 19 and 16 are temporarily fixed together, they will maintain the same relative fixed position with respect to each other at all times, so that in the positions shown by Figs. 19, 20 and 21, the relative positions are the same as those shown by Figs. 22, 23 and 24, and it will further be evident that when these members are rotated one revolution, the repeating and set back operation is effected, for each counter wheel is picked up when its pawl 29 engages in its corresponding notch and the counter wheels are rotated again to the position shown by Figs. 19, 20 and 21.

The operation of the counting pawls will be readily understood from the description of their construction. As previously explained, the unit counting pawl is provided with two fingers 66 and 67, the former of which extends below the finger 67 and with a projecting portion 69 (see Fig. 36), and the fractional counting pawl is provided with a finger 62 and a portion 63 which engages below the projection 69 of the unit counting pawl. The finger 62 of the fraction counting pawl also extends below the lowermost portion of the finger 66 (see Fig. 35) and in operating the counter wheels, it is necessary, of course, that the fractional counting wheel 3 be rotated one complete revolution or eight notches for every notch or division of the next unit counting wheel 2, so that the finger 62 of the fraction counting pawl must engage in a deep notch of the counting ratchet disk 11 before the next counting pawl will be permitted to engage its finger 66 in one of the notches of the units counting disk 9 for counting wheel No. 2. In the same manner, counting wheel No. 2 must be rotated one complete revolution before counting wheel No. 1 will be engaged and rotated one notch or division. Under these circumstances, it will be evident that both the fingers 62 of the fractional counting pawl and the finger 66 of the unit counting pawl must be in engagement with the deep notch of their corresponding ratchet wheels before the finger 67 will engage the counting ratchet disk of counting wheel No. 1. The fractional counting ratchet disk being provided with only eight notches, while the other ratchet disks are provided with ten notches, necessitates that the fractional counting pawl be separated from the units counting pawl and at the same time both pawls must be provided with means whereby the unit counting pawls may be raised when the fractional counting pawl is raised. Both of the pawls are provided with springs, as previously described, which tend to press them in engagement with their corresponding notches.

When it is desired to pump any desired quantity and to automatically stop the pump when the predetermined quantity is pumped, the predetermining mechanism of the pump may be set by means of the hand wheels at one end of the meter in the manner already described and the quantity for which the pump is set will appear on the number wheels 1, 2 and 3 through the aperture 174 in the casing, as viewed in Fig. 7. In setting the predetermining mechanism, the tumblers are raised which causes the shaft 50, upon which they are mounted to be slightly rotated in accordance therewith, as previously explained. If the pump and meter are now operated, the continued operation will cause the individual register wheels 4, 5 and 6 to register the amount pumped, while the predetermining mechanism and the predetermining counter wheel will register the amount that will be pumped by means of the counter wheels 1, 2 and 3. When the entire amount required to be pumped has been discharged, the individual register counter wheels will indicate the amount and the predetermining counter wheels 1, 2 and 3 will register zero, whereupon the counter wheels may be again set for the same amount or for a different amount by means of the hand wheels at the end of the meter, as previously set forth. Assuming, however, as in the normal operation of the device when the quantity predetermining mechanism is operated and the tumblers are raised, the pawl 137 at the end of the shaft 57 cannot engage with the notch 135 of the flange of the crib member 132 and consequently the operating gear 143 cannot be rotated in the proper direction by reason of the engagement of the clutching rollers 133 (see Fig. 12), as previously described; but the end of the pawl 137 will be forced downwardly against the edge of the flange 134 of the crib 132 by reason of the tension of the spring 59 which is mounted upon the shaft 57. Consequently, the lug 58 on the tumbler 56 will be moved away from the lug 61 on the member 60, thereby adding tension to the spring 59, one end of which engages with the keyway of the shaft 57 and the other end of which engages with the lug 58 on the tumbler 56. If the operating gear 143 is now rotated in a direction opposite to that indicated by the arrow in Fig. 13 by turning backward on the pump crank 156, the rollers 140 (see Fig. 11) will take hold and rotate the roller ratchet and the crib 132 with the gear 143, until the shoulder of the recess 149 strikes the key 131. It can now be plainly seen that the back-lash between the driving gear 155 and the pump crank shaft 161 is provided to effect this back motion without turning the crank shaft 161 backward. When this back movement is effected, the springs 153 will be compressed and the notch 135 in the flange of the crib 132 will be moved so that the pawl 137 can engage therewith. At this time the positive stop is reached, as previously described, and the engagement of the key 131 with the shoulder of the recess 149 will cause the clutch rollers 140 to be disengaged. If the operating gear 143 is now rotated in the opposite direction by turning the crank handle in the forward direction, the pawl 137 will prevent the return of the roller crib 132 and the roller ratchet 138 under the action of the springs 153, thereby preventing the clutch rollers from taking a hold, and as the ratchet rollers 140 will only take hold in the backward movement of the gear 143, they will disengage and permit the gear to be rotated in a forward direction, and as a consequence the pump can be operated.

Upon examination, it will be seen that when the pawl 137 drops to the bottom of the notch 135 in the crib flange 134, the lug 61 on the collar 60 is still some distance away from the lug 58 on the tumbler 56. This is for the purpose of giving a hammering effect together with the tension of the spring 53 on the shaft 50, so that when the tumblers drop, the pawl 137 will surely disengage from its connection with the notch 135. As the pump is operated and when the pawl 137 is disengaged, the friction resistance due to the operating gear 143 rotating on the crib and roller ratchet will aid the springs 153 in moving the crib so that the clutch rollers 133 can engage and stop the pump when the tumblers drop. It will be seen that the roller ratchets and the roller crib will move no faster than the operating gear 143 as the stopping of the pump is effected. Hence, the pump will not be stopped instantly when the tumblers are dropped. Allowance can be made for this, however, by mounting the drum 96 so that the tumblers will drop a little in advance and stop the pump exactly at the proper time.

In the preferred construction of the pump, which is employed in connection with the meter, it will discharge two pints for each revolution, so that there must be a two to one ratio between the driving gear 155 of the pump and the operating gear 143 of the meter in order that the meter may register a pint for each revolution of its operating gear. It will be evident that as soon as the pawl 137 is disengaged from the notch 135, the pump cannot again be operated until the hand wheels at the other end of the meter are set. When the cap 167 is in position and the tumblers are down, it is evident, therefore, that the pump cannot be operated by an unauthorized person.

The total registering mechanism which comprises the counter wheels 110 and 111 will, of course, register the total amount pumped up to the limit of the register and in the manner described.

Although this meter is particularly described and designed for use in connection with a liquid pump, it is obvious that the meter could be applied to any self-measuring machine where it would operate in the same way substantially as herein set forth. I desire, therefore, not to be limited to the exact embodiment herein described, for it is obvious that those skilled in the arts to which this relates may make various changes in the construction, combination and arrangement of the several parts without departing from the spirit and scope of my invention.

What I claim is:

1. The combination of a registering meter, a control device for said meter, a pump, means for operating said pump and meter, a lost motion connection between the operating means and the pump to permit slight movement of said operating means without actuating said pump and mechanism for setting said control device during the said slight movement of said operating means.

2. The combination with a registering meter having an operating gear, of a pump having a driving gear, a lost motion connection whereby the meter gear may be rotated backward without operating the pump, and mechanism for controlling said meter arranged to be actuated by the said backward rotation of said meter gear.

3. The combination with a registering meter, of a pump, means for operating said pump, means for connecting the meter to operate with the pump, lost motion mechanism whereby said connecting means for said meter may be operated by said pump operating means in a reverse direction without operating the pump, a clutch for controlling the operation of said meter and means for releasing said clutch during the said reverse operation of said operating means.

4. The combination with a registering meter, of a pump, means to connect the meter to operate with the pump, and a lost motion connection whereby the same means may be operated in a reverse direction for a predetermined distance without effecting the operation of the pump.

5. The combination with mechanism having a driving gear, of a meter having an operating gear continuously meshing with said driving gear, means for operating said driving gear, and a lost motion connection between said operating means and said mechanism operated thereby to permit said operating means to impart a slight backward movement to the driving gear and meter while said driving mechanism is unmoved.

6. In a meter for a continuous pump, the combination with an operating gear for the meter, of a driving gear continuously meshing with said operating gear and rotated when the pump is operated, means for operating said pump, a driving shaft for the pump, and means connecting the driving shaft and said driving gear whereby the driving gear may be rotated a limited amount in a reverse direction by said pump-operating means and free from engagement with the driving shaft.

7. A combined registering meter and pump comprising a predetermining mechanism with counter wheels to indicate the amount to be pumped, and separate registering wheels to indicate the amount pumped at any period during an operation.

8. In a meter for a continuous pump, the combination of a predetermining mechanism and a clutch mechanism, means whereby the clutch mechanism will be operated by the predetermining mechanism at a predetermined time, mechanism to continuously record the operation of the predetermining mechanism and means for operating said recording mechanism at each operation of said predetermining mechanism an amount proportional to the operation of said predetermining mechanism.

9. In a meter, a predetermining mechanism, comprising counter wheels, hand wheels therefor, means connecting each counter wheel with a corresponding hand wheel, said hand wheels being provided with abutting faces, and means to lock said hand wheels together in fixed position.

10. In a meter, a predetermining mechanism comprising co-acting counter wheels, hand wheels therefor, means to connect each counter wheel with a corresponding hand wheel, said hand wheels being formed with correspondingly inclined surfaces, whereby a portion of each wheel will nest within another, and means for locking the inclined portions of said hand wheels together in any rotated relation with respect to each other.

11. In a meter, a predetermining mechanism comprising coöperating counter wheels, hand wheels, means connecting the hand wheels with corresponding counter wheels, said hand wheels being provided with coöperating beveled surfaces, a clamping plate, and means associated with said plate to press the hand wheels releasably together to hold them in relative fixed positions.

12. In a meter, a predetermining mechanism comprising interdependent counter wheels, hand wheels therefor, means to connect the hand wheels to corresponding counter wheels, a shaft, the said hand wheels being provided with coöperating beveled surfaces and being disposed adjacent each other along said shaft, said shaft being threaded at the end, and a hand wheel threaded on said shaft and operative to press the said beveled surfaces of the hand wheels together axially to hold them releasably in relative fixed position with respect to each other.

13. In a meter, a predetermining mechanism, comprising counter wheels, hand wheels therefor, a shaft, sleeves disposed one within the other about said shaft to connect the counter wheels with corresponding hand wheels, said hand wheels being disposed along said shaft and provided with coöperating frictional engagement surfaces, the adjacent portion of the shaft being provided with a key-way and threaded, a plate mounted upon said shaft for free longitudinal movement having a key to engage in said key-way and adapted to be pressed against said hand wheels to lock them in position with respect to each other, and a threaded hand wheel disposed upon the shaft in position to be moved against said plate to lock the hand wheels in fixed position.

14. In a meter, a predetermining mechanism, comprising counter wheels, hand wheels therefor, a shaft, sleeves disposed one within the other about said shaft to connect the counter wheels with corresponding hand wheels, said hand wheels being disposed along said shaft and provided with coöperating frictional engagement surfaces, the adjacent portion of the shaft being provided with a key-way and threaded, a plate mounted upon said shaft for free longitudinal movement having a key to engage in said key-way and adapted to be pressed against said hand wheels to lock them in position with respect to each other, a pin projecting from said plate, a threaded hand wheel adapted to be positioned upon said shaft and to be moved against said plate to lock the hand wheels in position with respect to each other, said plate being provided with a radial web to engage said pin, whereby the rotation of the threaded hand wheel with respect to the plate is limited in both directions.

15. In a meter, a predetermining mechanism, comprising counter wheels of the same diameter disposed adjacent to each other, and each formed with an extension of reduced outside diameter extending toward but not within the next adjacent wheel.

16. In a meter, a predetermining mechanism, comprising counter wheels of the same external diameter and with central openings of the same diameter, said counter wheels being formed with projections of reduced outside diameter and being disposed adjacent to each other upon the same axis with the projections extending in the same direction but not within the next adjacent wheel.

17. In a meter, a predetermining mechanism, comprising a plurality of counter wheels coaxially mounted for free rotation with respect to each other, and non-rotatable plates disposed between adjacent wheels to prevent frictional engagement between adjacent counter wheels.

18. In a meter, a predetermining mechanism, comprising counter wheels in the shape of an annular ring, each with the same inside and outside diameter and having a lateral extending portion of reduced outside diameter, a counting ratchet disk, a tension ratchet disk, and a tumbler disk, all of said disks being mounted upon the extending portion of each counter wheel and positively secured to the said counter wheel.

19. In a meter, a predetermining mechanism comprising a plurality of separate counter wheels, means to set the counter wheels in desired positions, a tension ratchet disk for each counter wheel provided with notches therein, a spring pressed tension ratchet pawl for each disk adapted to engage in the notches of said tension ratchet disk to prevent the rotation of each counter wheel in the reverse direction, and external means for operating said wheels.

20. In a meter, a predetermining mechanism, comprising separate counter wheels, and means for rotating said counter wheels in one direction to set said wheels at a predetermined value, said counter wheels being each provided with a spring pressed pawl, said means being provided with notched members to engage each of the pawls independently, and external means for operating said wheels.

21. In a meter, a predetermining mechanism, comprising counter wheels placed side by side, members upon which the counter wheels are rotatably mounted, means in connection with each of said counter wheels for engaging one of said members when they are rotated relatively in one direction of rotation, said members being provided with means extending within and to one side of said wheels whereby the counter wheels may be independently rotated and positioned.

22. In a device of the class described, a predetermining mechanism, comprising counter wheels arranged side by side, separate members upon which said counter wheels are rotatably mounted, said members being each provided with a groove in its outer surface, and said counter wheels being each provided with a recess, and a spring pressed pawl mounted in said recess of each counter wheel and adapted to engage the notch of the corresponding member when the counter wheel and member are rotated relatively in one direction with respect to each other.

23. In a device of the class described, a predetermining mechanism, comprising a rotatable shaft, hand wheels freely mounted thereon, said wheels being disposed adjacent to each other, a core secured to said shaft, and means to lock said wheels together laterally against said core in any relative position with respect to each other.

24. In a device of the class described, a predetermining mechanism, comprising a shaft, a core secured to said shaft, sleeves mounted upon said shaft, and one surrounding the other, collars secured to said sleeve at one end thereof abutting each other and one of them abutting the core, a sleeve shaped member having a hand wheel at one end surrounding the outer sleeve and abutting the end of the adjacent collar, hand wheels secured to the other ends of said sleeves, counter wheels freely rotatable upon said collars, and one of them being rotatable upon the adjacent end of the sleeve shaped member, means to engage each of the counter wheels with a corresponding collar and with the said sleeve shaped member, and means to releasably bind the hand wheels together against the end of said collar and in any relative position with respect to each other.

25. In a device of the class described, a predetermining mechanism, comprising a shaft, a core secured thereto, sleeve members rotatable upon the shaft, one of them freely rotatable about the other, collar members secured to the ends of said sleeves in contact with each other and one of them abutting the end of the core, a sleeve shaped member surrounding the outermost sleeve abutting the adjacent collar and having a hand wheel at the other end, hand wheels secured to the other ends of the sleeves with coöperating inclined faces, counter wheels rotatably mounted upon said collars and the adjacent end of the said sleeve shaped member, means to releasably engage each of said collars and the said sleeve shaped member with a corresponding counter wheel, a clamping plate to engage said hand wheels, and a clamping wheel movable to engage the clamping plate to hold the hand wheels releasably in fixed position with respect to each other and to provide means whereby the shaft and all of said members may be rotated in a single direction as an entirety.

26. In a device of the class described, a movable member, a predetermining mechanism for said member, a clutch mechanism, and means operated by the predetermining mechanism to effect the operation of the clutch mechanism at a predetermined time to mechanically control operation of said movable member.

27. In a device of the class described, a predetermining mechanism comprising coaxially counter wheels, means to independently adjust and position the counter wheels, and locking means to secure the said adjusting means in fixed relative position with respect to each other, whereby all of the said counting wheels may be set at a predetermined position at the same time.

28. In a device of the class described, a predetermining mechanism, comprising a plurality of rotatable counter wheels, means to rotate each of said wheels independently to set them in a predetermined position, and tumbler disks secured to each of said wheels which are each provided with a single notch, said counted wheels being provided with indicating characters on the periphery thereof, and being so disposed that the notches of the disks of all of said counter wheels register when the counter wheels are all in the same position.

29. In a device of the class described, the combination with counter wheels freely rotatable with respect to each other, a notched tension disk, a notched counting ratchet disk, one of each of said disks being secured to each of said counter wheels, a spring pressed tension pawl to engage in the notches of each tension ratchet disk to prevent the backward rotation of each of said counter wheels, and a ratchet mechanism provided with pawls adapted to engage each of the notches of said counting ratchet disks and being reciprocable to effect the movement of said counting wheels one notch at a time, said pawls being provided with engaging portions to prevent the rotation of the next higher counter wheel until the lower counter wheel has been rotated one complete revolution.

30. In a device of the class described, the combination with counter wheels, each provided with a notched counting ratchet disk, and a reciprocating ratchet mechanism comprising pawls separately mounted but having an overlapping portion and formed with fingers of different lengths, one finger engaging one of said counting ratchet disks, said pawls being of different sizes whereby one counting ratchet disk must be rotated a complete revolution before the next pawl will engage with the counting ratchet disk of the succeeding counter wheel.

31. In a meter of the class described, the combination with counter wheels, one of which is provided with a different number of indicating characters, notched counting ratchet disks secured to each of said wheels and having a number of notches corresponding to the number of characters upon each wheel, and a counting ratchet mechanism comprising pawls having fingers of different depths to engage the notches of the several counting ratchet disks, the pawl for said counter wheel of the different number of characters being free from the pawls for the other counter wheels, the said pawls for the other counter wheels being connected to move in unison and being provided with an overhanging projection which is engaged by the other pawl.

32. In a device of the class described, a reciprocable ratcheting device, comprising pawls, one of which is provided with one or more fingers of different depths and with an overhanging projection at one end, and another pawl free from engagement with the first named pawl having a single finger and a portion adapted to engage the projection of the first named pawl when this pawl is raised, whereby the other pawl is also raised.

33. In a device of the class described, a ratcheting mechanism comprising spaced disks reciprocable radially about a common axis, bars extending between said disks, pawls each having spaced bearings mounted upon one of said bars between said disks, a spring surrounding said bar between the bearings of each of the pawls adapted to bear at one end against another bar to press the pawls resiliently in one direction.

34. In a device of the class described, the combination with counter wheels, of a ratcheting mechanism therefor, comprising end plates rotatable about the same axis, bars extending between the said plates, means to reciprocate said plates through an arc of movement, pawls mounted upon one of said bars having fingers adapted to engage and operate each of said counting wheels, some of said pawls being provided with spaced engaging fingers of different lengths and others with a single finger, and means to press said pawls resiliently in position to engage each of said counter wheels, said pawls being provided with engaging portions whereby one pawl is prevented from engagement with its corresponding wheel until the next preceding pawl finger is in a predetermined position.

35. In a device of the class described, a counting ratchet mechanism comprising plates spaced apart and rotatable about the same axis, a portion of said plates being each provided with peripheral teeth, a shaft having toothed portions to engage with the teeth of each of said plates, and means to oscillate the shaft through a predetermined arc of movement in both directions.

36. In a device of the class described, the combination of a predetermining mechanism, comprising indicating counter wheels, means for positioning said counter wheels, a shaft upon which said means are rotatable, a core secured to said shaft, means for locking the wheels together against the core, and a locking means for preventing rotation of said core.

37. In a device of the class described, a shaft, a core secured thereto, counting wheels mounted on said core, said shaft and core being rotatable and movable longitudinally, means for adjusting said counting wheels by rotation of said shaft, and means to lock said shaft and core against rotation.

38. In a device of the class described, a shaft, a core secured thereto, said shaft and core being rotatable and movable longitudinally, and means to prevent the rotation of said shaft and core until they have been moved longitudinally.

39. In a meter of the class described, a shaft, a core secured thereto, said shaft and core being rotatable and movable longitudinally, said core being provided with a longitudinally extending groove and an annular groove in the periphery thereof, and a locking device therefor comprising a plate surrounding the core and fixed against rotation, having a projection to engage in the said grooves in the periphery of said core.

40. In a device of the class described, the combination with a core formed with a longitudinally extending groove and an annular groove in the surface thereof, of a shaft secured thereto, means tending to press the core and shaft in one direction, and a locking device comprising a plate fixed against rotation, having a projection to engage in the said grooves of the core and adapted to engage the longitudinal extending groove to prevent the rotation of the core until the core and shaft are moved longitudinally against said means, which tends to press them in one direction.

41. In a device of the class described, the combination with a core provided with a longitudinal and an annular outside groove, a shaft secured thereto, springs tending to press the core and shaft in one direction, and a locking plate fixed against rotation with respect to the core and having a projection adapted to engage in both of said grooves of the core, said springs being adapted to press the core and shaft longitudinally with respect to the locking plate so that the projection thereof will slip out of the annular grooves as the core and shaft are rotated to engage only with the longitudinal groove whereby the rotation of the shaft and core is prevented until the shaft and core are moved longitudinally with respect to the locking plate against the pressure of said springs.

42. In a meter, an operating shaft, a core secured thereto, counter-wheel operating mechanism comprising sleeves independently rotatable upon said shafts each being provided with abutting collar members at one end and accessible hand wheels at the other end, means for locking said hand wheels axially together and for pressing said sleeves and hand wheels against the fixed core whereby said operating mechanism for the counter-wheels is locked in fixed relation against the said core.

43. In a meter, the combination with an operating shaft, of a core secured thereto, counter-wheel operating mechanism mounted on said shaft and comprising sleeve members freely rotatable about the shaft and about each other having hand wheels at the outer end thereof, a clamping wheel for locking the operating members in fixed relation with respect to each other and to the core, and means to engage the core and lock it and the operating shaft in fixed position.

44. In a meter, the combination with an operating shaft, of a core secured thereto, counter-wheel operating mechanism mounted on said shaft and comprising sleeve members freely rotatable about the shaft and about each other having hand wheels at the outer end thereof, a clamping wheel for locking the operating members in fixed relation with respect to each other and to the core, means to engage the core, resilient means to permit the longitudinal movement of said shaft and the connected parts, and a releasable locking device to engage the core until it is moved longitudinally against said resilient means.

45. In a meter, the combination with an operating shaft, of a core secured thereto, counter-wheel operating mechanism mounted on said shaft and comprising sleeve members freely rotatable about the shaft and about each other having hand wheels at the outer end thereof, a clamping wheel for locking the operating members in fixed relation with respect to each other and to the core, means to engage the core, resilient means to permit the longitudinal movement of said shaft and the connected parts, and means to limit the longitudinal movement of the said shaft and the operating mechanism connected thereto.

46. In a meter, the combination with an operating shaft, of counter-wheels, setting mechanism for counter-wheels mounted upon the shaft, the counter-wheels being disposed outside of the setting mechanism, spaced supports for the counter-wheels, one of said supports being provided with longitudinal openings, and resilient means disposed in said openings tending to press the setting mechanism longitudinally of the shaft away from the said support.

47. In a meter, the combination with an operating shaft of counter-wheels, setting mechanism for said counter-wheels having accessible hand wheels at one end of the shaft, spaced supports between which the counter-wheels are mounted and in which the shaft rotates, the said hand wheels being disposed outside of one of the supports, the support adjacent the hand wheels being provided with perforations parallel with the shaft, and resilient means disposed in said perforations bearing at one end against the counter-wheels to press them resiliently against the other support and bearing against the innermost hand wheel at the other end, thereby tending to press the operating shaft longitudinally and lock it in fixed position.

48. In a meter, the combination with an operating shaft of counter-wheels, setting mechanism for said counter wheels having accessible hand wheels at one end of the shaft, spaced supports between which the counter-wheels are mounted and in which the shaft rotates, said hand wheels being disposed outside of one of the supports, the support adjacent the hand wheels being provided with perforations parallel with the shaft, and means to permit the rotation of the operating shaft to a pre-determined point whereupon the said resilient means will press the shaft longitudinally and lock it in fixed position.

49. In a meter, a predetermining mechanism comprising counter-wheels and means to set the counter-wheels in any desired position, tumbler disks in connection with said wheels, means to operate said counter-wheels, tumblers to coöperate with said tumbler disks, a ratchet mechanism for said counter wheels comprising a drum having a recess cam portion and being continuously rotated in one direction when the meter is in operation, another tumbler adapted to coöperate with the said cam-shaped portion and having connection with the other tumblers to be operated simultaneously therewith when the tumbler disks of the said cam-shaped portion are in predetermined positions.

50. In a meter, the combination of a predetermining mechanism, an operating mechanism, said predetermining mechanism comprising separate counter-wheels, tumbler disks in connection with said wheels, a shaft, tumblers mounted thereon adapted to coöperate with said tumbler disks when they are in prescribed positions, said operating mechanism comprising a cam surface to coöperate with one of said tumblers having a recess portion with which the corresponding tumblers must register before the tumbler shaft can be rotated and control mechanism governed by said tumbler shaft.

51. In a meter, the combination of a predetermined mechanism, an operating mechanism, said predetermined mechanism comprising separate counter-wheels, a shaft, tumbler disks in connection with said wheels, tumblers mounted therein adapted to coöperate with said tumbler disks when they are in prescribed positions, said operating mechanism comprising a cam surface to coöperate with one of said tumblers having a recess portion with which the corresponding tumblers must register before the tumbler shaft can be rotated, and means tending to rotate the tumbler shaft in one direction and control mechanism governed by said tumbler shaft.

52. In a meter, the combination of predetermining mechanism comprising counter-wheels having notched tumbler disks, of external operating mechanism comprising a drum having a notched cam surface, a shaft, tumblers secured to said shaft adapted to coöperate with the tumbler disks and said notched cam surface, and a spring tending normally to press the tumblers into engagement with the tumbler disks and tumbler cam.

53. In a meter, the combination with a predetermining mechanism comprising counter-wheels having notched tumbler disks and means to position the counter-wheels, of an operating mechanism comprising a member having a notched cam member, tumblers adapted to simultaneously coöperate with the tumbler disks and the tumbler cam surface, means to press the tumblers into engagement with their respective tumbler disks, and said notched cam surface being provided with a portion of larger diameter to engage its tumbler and raise all of the tumbler disks when the predetermining mechanism is reset.

54. In a meter, a tumbler shaft, tumblers mounted thereon, a spring tending to rotate the shaft in one direction, notched disks to coöperate with said tumblers, one of said disks being provided with a raised portion to rotate the tumbler shaft when the disks are rotated.

55. In a meter, the combination with spaced supports, of a rotatable tumbler disk shaft mounted therein, slotted forked members extending on both sides of the shaft and spaced apart, and tumblers secured to the shaft and disposed in the slot between the forked members to hold the tumblers in fixed position upon the shaft.

56. In a meter, the combination with a frame comprising a fixed support, of a longitudinal notched shaft mounted therein, fingers projecting from said frame and extending about the shaft, the fingers being spaced apart and provided with slots therein and perforated tumblers with an inwardly extending projection to engage in the groove of said shaft adapted to be inserted in the slot of said fingers and to be maintained in a fixed longitudinal position with respect to the shaft regardless of its rotation.

57. In a meter, the combination of a clutch mechanism, a clutch operating pawl, a shaft upon the end of which the pawl is secured, a collar with a lug thereon being freely mounted on the other end of the shaft, a spring having engagement with the collar and with the shaft holding the collar in predetermined position, a tumbler shaft coaxially disposed with respect to the other shaft, a tumbler mounted on one end thereof into which the end of the other shaft projects, said tumbler being formed with a lug which coöperates with the lug of the said collar, tumblers mounted on the tumbler shaft, a spring tending to press the lugs of the tumbler and of the collar in engagement with each other, tumbler disks to hold the said lugs out of engagement with each other when the tumblers are raised during the operation of the meter and effective to drop the tumblers and the tumbler shaft so that the lug on the tumbler will sharply engage the lug on the collar to release the pawl on the end of the other shaft from its engagement with the clutching mechanism.

58. In a meter, the combination with counter-wheels, of a ratcheting mechanism therefor comprising a driving shaft rotatable continuously in one direction, another shaft parallel thereto oscillatable in both directions and means including an eccentric connecting the two shafts for transmitting oscillating movement to one shaft by the continuous rotation of the other.

59. In a meter, the combination with counter-wheels, of a ratcheting mechanism therefor comprising oscillatable ratchet pawls, a continuously rotatable driving shaft and oscillatable rotating shaft having connection with the pawls, and an uninterrupted driving connection to convert the continuous movement of the driving shaft to an oscillating movement and to impart the oscillating movement to the oscillatable shaft.

60. In a meter of the class described, the combination with a continuously rotatable driving shaft, of an oscillatable shaft, and means operatively to connect the shafts comprising a member surrounding said driving shaft having a portion concentric therewith and a portion eccentric therewith, a plate mounted upon the concentric portion of said member having teeth in a portion of the circumference meshing with the oscillatable shaft, said plate having a radial slot, a fixed support for said shaft having a slot extending radially from said shaft at a point opposite from the slot in said plate, and a ring-shaped member freely mounted upon the eccentric portion of said member having diagrammatically opposite projections extending on opposite sides of the ring-shaped member into the two said slots whereby the rotation of the eccentric member will cause the reciprocation of the driving plate and of the oscillatable shaft.

61. In a meter of the class described, the combination of a continuously rotatable driving shaft, of an oscillatable shaft and means for connecting the latter with the driving shaft, said means comprising a member freely mounted upon the driving shaft having concentric and eccentric hub portions, clutching means to connect the member for rotation with the shaft in one direction, a driving plate having teeth in engagement with the oscillatable shaft rotatably mounted upon the concentric hub of the said member and being provided with a radial slot, a fixed support for said shaft having a slot extending radially from the shaft substantially opposite from the slot in said plate member, a ring mounted upon the eccentric hub of said member projections extending into the slots from opposite sides of the ring and from diametrically opposite points thereof whereby the rotation of said hub member will effect the oscillation of the ring member about the projection movable in the slotted support, thereby producing the oscillation of the plate and the oscillation shaft connected therewith.

62. In a meter, the combination with predetermining mechanism comprising a plurality of separately adjustable counter-wheels, of an individual quantity register mechanism comprising counter - wheels, means for operating both sets of counter-wheels simultaneously, and means controlled by said predetermining counter wheels to govern the quantity registered by said registering counter wheels.

63. In a meter, the combination with predetermining mechanism comprising a plurality of separately adjustable counter-wheels, each having a succession of peripheral digits individual quantity registering mechanism comprising counter-wheels each with a succession of digits arranged in reverse order with respect to the other counter-wheel digits, and means controlled by said predetermining counter wheels to govern the quantity registered by said registering counter wheels.

64. In a meter, the combination with separately adjustable counter-wheels, of individual quantity registering wheels, said counter-wheels being each provided with a succession of numerals on the peripheral face thereof, the numerals of one group of counter-wheels being oppositely disposed with respect to the numerals of the other group to decrease as the other increases, and ratcheting means to move both sets of counter-wheels.

65. In a meter, the combination with predetermining mechanism comprising separately adjustable counter-wheels, with individual quantity registering counter-wheels, each of the counter-wheels of each group being provided with a set of digits similar to the corresponding wheel of the other group and disposed thereon in opposite succession, and means controlled by said predetermining counter wheels to limit the amount registered by said registering counter wheels at each operation thereof.

66. In a meter, the combination with predetermining mechanism comprising separately adjustable counter-wheels, of individual registering counter - wheels, the counter-wheels of the two groups being similarly disposed and each having a series of digits on the peripheral face thereof but oppositely disposed in the different groups, means for ratcheting the counter-wheels of the different groups simultaneously, the quantity registered at any time being indicated by the counter-wheels of the individual register counts and the quantity to be registered being indicated by the counts of the predetermining mechanism, and means for stopping the operation of said counter wheels when said predetermining counter wheels register zero.

67. In a meter for pumps and the like, the combination with a predetermining mechanism comprising separately adjustable counter-wheels, of individual quantity registering counter-wheels, said counter-wheels being arranged in corresponding sets and the counter-wheels of each set being provided with a series of numbers on the periphery thereof oppositely disposed with respect to the numbers of the other set, a perforated casing for observing the numerals on the counter-wheels at certain points, the numerals of the predetermining counter-wheels indicating at any time the amount of that predetermined that is still to be pumped and the numerals of the other set of counter-wheels indicating the amount of that predetermined which is already pumped, and stop mechanism controlled by said predetermining counter wheels and arranged to be operated when said wheels register zero.

68. In a meter, the combination with predetermining mechanism comprising counter-wheels, of individual register mechanism comprising other counter-wheels, the counter-wheels of both sets corresponding and being provided with oppositely extending numerals on the peripheries thereof, means for setting the predetermining counter-wheels, means for setting the other counter-wheels to zero, operating means for operating said wheels in opposite directions until the readings thereof are interchanged, and means for stopping said operating means when this interchange is complete.

69. In a meter of the class described, the combination with perforated counter-wheels, of means for mounting said counter-wheels through the perforations thereof for free rotation, and pawls in connection with the counter-wheels for engaging said means at predetermined times whereby the counter-wheels may be rotated and set as desired.

70. In a meter of the class described, the combination with counter-wheels arranged side by side having a central perforation, of members upon which the counter-wheels are separately mounted for free rotation, said members being each provided with a longitudinal peripheral groove and a spring pressed pawl in connection with each of the counter-wheels and adapted to engage the groove of its corresponding member at a predetermined time.

71. In a meter, the combination with counter-wheels in the form of rings, each provided with a recess opening from the interior thereof, a spring pressed pawl mounted in the recess, and a rotatable member upon which the counter-wheel is rotatable having a longitudinal groove adapted to be engaged by the pawl, whereby the counter-wheel may be separately rotated by the member for setting it, as desired.

72. In a meter, the combination with counter-wheels in the form of rings, each provided with a recess opening from the interior thereof, a spring pressed pawl mounted in the recess, and a rotatable member upon which the counter-wheel is freely rotatable in one direction, the member being provided with a groove to engage the pawl to prevent the rotation of the counter-wheel in the other direction and to provide means whereby the counter-wheel may be independently rotated by the rotation of said member.

73. In a meter, the combination with predetermining mechanism comprising counter-wheels, means for independently setting each of said counter-wheels in a predetermined position, ratcheting mechanism for said counter-wheels whereby they are returned to a zero position, and locking means for said predetermining mechanism whereby the predetermining mechanism is clamped in fixed position to reset the predetermining counter-wheels to the previous predetermined position without individual adjustment of each counter-wheel.

74. In a meter, the combination with predetermining quantity counter-wheels, of setting mechanism therefor comprising an individually rotatable member for each counter-wheel, means to engage each of said members with the corresponding counter-wheels, and a device for locking the said individually rotatable members together in a fixed position, the counter-wheels being freely rotatable about their respective members in one direction of rotation and the members being adapted to engage the counter-wheels when rotated in the same direction.

75. In a meter, the combination with separately adjustable counter-wheels, of means for separately adjusting each of said counter-wheels, said means comprising a pawl connected to each of said counter-wheels, and rotatable members upon which they are mounted, each having a groove to engage the corresponding pawl, a shaft upon which said members are rotatable, a core secured to the shaft, individual quantity registering counter-wheels rotatably mounted upon the core, means for locking the said members in fixed engagement with each other and with the core whereby they are maintained in any adjusted position, said last named counter-wheels being also provided with pawls, and said core being provided with a longitudinal groove to engage the pawls, and ratcheting mechanism for said counter-wheels, the said shaft and said members being rotatable as a whole in one direction to return the individual quantity registering counts to zero position and to reset the predetermining counts to any previously determined position.

76. In a meter, the combination with a total register mechanism, of a predetermining register mechanism, and an individual or batch registering mechanism, means for driving said meter, and means controlled by said predetermining register mechanism for controlling said driving means.

77. In a meter, the combination with a total registering mechanism, of predetermining register mechcanism, individual register mechanism and driving means for the several register mechanisms whereby the individual and predetermining mechanisms are operated when the total registering mechanism is operated in unison and numerically reverse to each other, and means controlled by said predetermining mechanism to regulate the amount of operation of said driving means.

78. In a meter, the combination with predetermining individual and total registering mechanisms, of operating means therefor, and clutch mechanism automatically operated by the predetermining mechanism to release the clutch when a predetermined quantity has been registered to prevent further operation of said individual and total registering mechanism by said operating means therefor.

79. In a meter, the combination with a driving shaft, of counter-wheels surrounding the shaft and having indicating numerals upon the face thereof, one having less numerals than the others, and a reduction gear for communicating movement to the said one of the counter-wheels so that the rotation of the shaft will produce a fractional rotation of it, said gear comprising a perforated plate and a circular disk rotated therein but eccentrically mounted on the shaft.

80. In a meter, the combination with a driving shaft having a flattened portion, of a counter-wheel rotatable about the shaft having an internal gear, an eccentric disk having a slot in the edge to fit the flattened portion of the shaft and thereby secured to the shaft, a disk less in size than the interior of the counter-wheel having internal teeth less in number than the internal teeth of the counter-wheel and rotatable about the said eccentric disk, and means for permitting the oscillation of the disk but preventing its rotation whereby the teeth of the disk will engage the internal teeth of the counter-wheel producing a frictional rotation of the counter-wheel.

81. In a meter of the class described, a clutch mechanism comprising a plate with a peripheral notch therein, a spring-pressed shaft having a pawl at the end adapted to engage in said notch, and means to rotate the plate to engage the pawl in the notch.

82. In a meter, the combination with a fixed frame portion, of a tumbler shaft rotatable therein having a pawl projecting at one end thereof and a clutch comprising a flanged crib member with a peripheral notch and a lateral projection, the fixed portion of the frame being provided with a recess to receive the projection, a spring interposed between the projection and one end of the recess tending to press the crib in a direction away from the pawl, and means to counteract the pressure of the spring to place the crib in position to engage the pawl with the notch thereof.

83. In a meter, the combination with a fixed frame member, of a driving shaft mounted therein, a driving gear connected to the shaft, a clutch mechanism for preventing the rotation of the gear comprising a member secured to the frame within the driving gear and having a plurality of inclined outer faces, rollers disposed between the inclined outer faces and adapted to be moved into and out of engagement with the inner face of the gear, and means to move the rollers into and out of engaging position.

84. In a meter of the class described, a driving gear for operating the meter and clutch mechanism for the gear comprising friction rollers adapted to engage the inner surface of the gear in both directions of rotation, and means to engage one set of rollers to move them laterally whereby the driving gear can then be rotated in the opposite direction.

85. In a meter, the combination with a fixed frame portion, of a shaft rotatable therein, a gear secured to the shaft and rotatable therewith, clutching means having frictional engagement with the inner surface of the gear and the frame portion, said means comprising two separate sets of friction rollers, means tending normally to press one set of rollers into engagement with the gear whereby only a limited movement thereof is permitted in one direction, and a crib member adapted to space apart the rollers of the other set and movable to move the rollers into and out of engaging position with respect to the gear.

86. In a meter, the combination with a fixed frame portion, of a shaft rotatable therein, a gear secured to the shaft, a clutch mechanism for preventing the rotation of the gear in one direction, and means in connection with said clutch mechanism for permitting a limited movement of the gear in this same direction before the operation of the clutch mechanism.

87. In a meter, the combination with a fixed frame portion, of a shaft rotatable therein, a gear secured to the shaft, a key projecting from the fixed portion of the frame, a member rotatable thereon within the gear having an inner recess larger than the key to permit a limited movement of the member with respect to the key, said member being provided with peripheral recesses having inclined faces, and friction rollers disposed in said recesses and adapted to engage the face of the recesses and the inner face of the gear, to prevent its rotation in one direction.

88. In a meter, the combination with a fixed frame portion, of a driving shaft rotatable therein, the said frame portion being formed with a hub having a key-way therein, a cam faced member mounted upon said hub, a roller ratchet member also mounted on said hub having inside and outer recesses, a key adapted to engage the cam faced member to the hub and to permit the roller ratchet member to be moved a predetermined amount in both directions, a gear surrounding the roller ratchet member and positively secured to the shaft, rollers disposed in the outer recess of the roller ratchet member, other rollers disposed between the faces of the cam faced member and the inside face of the gear, a roller crib member having projections extending between the last named rollers and adapted to space them apart, means to engage the crib member with the roller ratchet member, the crib member being formed with a flange having a notch in the periphery thereof, means tending to press the crib member in one direction whereby the last named clutching rollers will be forced in engagement with the gear, and means comprising a shaft with a projecting pawl to engage the said notch of the crib member, the crib member and the roller ratchet member being movable a limited amount about the hub to place one or the other set of rollers in engagement with the gear.

89. In a meter, the combination with an operating shaft, of counting wheels, setting mechanism therefor mounted upon the shaft comprising hand wheels movable with respect to each other, a support adjacent the hand wheels provided with longitudinal openings, an abutment in one end of each opening having a shoulder thereon and adapted to engage the innermost hand wheels, the said opening being provided with a shoulder coöperating with the shoulder of the abutment and the abutment extending through the support, a separate abutment mounted in each opening at the other end thereof, and a resilient member disposed between the two abutments tending to press the hand wheels away from the support.

90. In a meter, the combination with a predetermining mechanism comprising counter wheels having notched tumbler disks, of an operating mechanism comprising a shaft, a second shaft independent thereof, tumblers mounted on the second shaft adapted to coöperate with said tumbler disks when they are in predetermined positions, said operating mechanism comprising a cam surface to coöperate with one of said tumblers and having a recess portion with which the corresponding tumbler must register before the tumbler shaft can be rotated, and a ratchet mechanism coöperating with the operating mechanism to permit the operating shaft to rotate in one direction whereby the cam surface may be returned to the predetermined starting point.

91. In a meter, the combination of an operating mechanism comprising a shaft, a cam secured thereto having a recess portion to form a cam point, a predetermining mechanism comprising separate counter wheels and tumbler disks in connection with said wheels, a tumbler shaft, tumblers mounted thereon adapted to coöperate with the tumbler disks when they are in predetermined positions, counter wheels in connection with the separate counting wheel, and a ratchet mechanism in connection with the operating mechanism to permit the rotation of the operating shaft in one direction only, whereby the said cam point and the counting wheels may be returned to predetermined starting points in case the operating mechanism has been driven a distance less than enough to cause the counting wheels to register.

In testimony whereof I have signed my name to this specification, in the presence of two subscribing witnesses, on this 12th day of September A. D. 1916.

REUBEN E. BECHTOLD.

Witnesses:
ANNA M. DORR,
KARL H. BUTLER.